United States Patent
Shariq et al.

(10) Patent No.: US 10,073,976 B2
(45) Date of Patent: Sep. 11, 2018

(54) APPLICATION EXECUTING METHOD AND DEVICE, AND RECORDING MEDIUM THEREOF

(71) Applicant: Samsung Electronics Co., Ltd., Suwon-si, Gyeonggi-do (KR)

(72) Inventors: Mohd Shariq, New Delhi (IN); Tasleem Arif, Uttar Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 14/919,217

(22) Filed: Oct. 21, 2015

(65) Prior Publication Data

US 2016/0117513 A1    Apr. 28, 2016

(30) Foreign Application Priority Data

Oct. 24, 2014  (IN) .......................... 3033/DEL/2014
Sep. 22, 2015  (KR) ........................ 10-2015-0133877

(51) Int. Cl.
    *G06F 21/60*    (2013.01)
(52) U.S. Cl.
    CPC ...... *G06F 21/60* (2013.01); *G06F 2221/2149* (2013.01)
(58) Field of Classification Search
    None
    See application file for complete search history.

(56) References Cited

U.S. PATENT DOCUMENTS

| | | | |
|---|---|---|---|
| 7,561,682 B2 | 7/2009 | Doherty et al. | |
| 8,402,011 B1 | 3/2013 | Bodenhamer | |
| 9,215,225 B2 * | 12/2015 | Desai | H04L 63/08 |
| 9,602,609 B2 * | 3/2017 | Bilinski | H04L 67/22 |
| 2012/0159139 A1 * | 6/2012 | Kim | H04M 1/72563 713/2 |
| 2012/0185949 A1 * | 7/2012 | Phillips | G06F 21/6263 726/26 |
| 2012/0240237 A1 * | 9/2012 | Kanevsky | G06F 17/30899 726/26 |
| 2013/0152010 A1 * | 6/2013 | Weber | G06F 17/30873 715/783 |
| 2013/0167045 A1 * | 6/2013 | Xu | G06F 21/6263 715/760 |
| 2013/0254884 A1 * | 7/2013 | Dalcher et al. | G06F 21/53 726/22 |
| 2014/0089833 A1 | 3/2014 | Hwang et al. | |
| 2014/0164941 A1 * | 6/2014 | Kim | G06F 21/36 715/741 |
| 2014/0195933 A1 | 7/2014 | Rao DV | |
| 2014/0283016 A1 * | 9/2014 | Sambamurthy | G06F 21/31 726/19 |

(Continued)

*Primary Examiner* — Michael R Vaughan
(74) *Attorney, Agent, or Firm* — Jefferson IP Law, LLP

(57) ABSTRACT

A system and method for setting windows to either a traceable mode or a non-traceable mode, and selectively executing an application in a window to restrict data storage related to the application execution is provided. The method includes selecting at least one window displayed by a device based on a user input sensed by the device, setting the selected window to a non-traceable mode, executing an application in the window and restricting storage of data generated according to the execution of the application in the window set to the non-traceable mode.

17 Claims, 40 Drawing Sheets

(56) References Cited

U.S. PATENT DOCUMENTS

| | | | |
|---|---|---|---|
| 2015/0074589 A1* | 3/2015 | Pan | G06F 3/04886 715/781 |
| 2015/0185995 A1* | 7/2015 | Shoemaker | G06F 3/0484 715/708 |
| 2015/0281383 A1* | 10/2015 | Bilinski | H04L 67/22 709/202 |
| 2016/0019391 A1* | 1/2016 | Ghosh et al. | G06F 21/56 |
| 2016/0026358 A1* | 1/2016 | Stewart | G06F 3/14 715/781 |
| 2016/0334989 A1* | 11/2016 | Liu | G06F 3/0488 |

* cited by examiner

APPLICATION EXECUTING METHOD AND DEVICE, AND RECORDING MEDIUM THEREOF

CROSS-REFERENCE TO RELATED APPLICATION(S)

This application claims the benefit under 35 U.S.C. § 119(a) of an Indian patent application filed on Oct. 24, 2014 in the Indian Patent Office and assigned Serial number 3033/DEL/2014, and of a Korean patent application filed on Sep. 22, 2015 in the Korean Intellectual Property Office and assigned Serial number 10-2015-0133877, the entire disclosure of each of which is hereby incorporated by reference.

TECHNICAL FIELD

The present disclosure relates to an application executing method, an application executing device, and a computer-readable recording medium storing a program for implementing the application executing method.

BACKGROUND

Due to the development of digital technologies, the number of electronic devices capable of performing various functions such as communication and personal information processing has rapidly increased. The electronic devices may execute applications capable of performing various functions such as short message services (SMSs), multimedia message services (MMSs), e-mails, electronic notes (e-notes), photographing, broadcast play, video play, music play, Internet, messengers, and social network services (SNSs).

For the security of data, some applications executed by the electronic devices may provide a private mode that does not store data. For example, web browsers may ensure the privacy of data by not storing a browsing history, images, videos, and texts. Similarly, applications related to instant messaging may provide a private mode that does not store data transmitted/received by users through communication sessions. Also, call applications may provide a private mode that does not store information about a call history.

Various technologies have been developed to provide a private mode for protecting the privacy of users. However, since the related art thereof is application-dependent, there is still a need to develop technologies capable of more easily protecting the privacy of users.

The above information is presented as background information only and to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods, apparatuses, and systems for protecting the privacy of data generated during the execution of an application.

Additional aspects will be set forth in part in the description which follows and, in part, will be apparent from the description, or may be learned by practice of the presented various embodiments of the present disclosure.

In accordance with an aspect of the present disclosure, a method for executing an application is provided. The method includes selecting at least one of a plurality of windows displayed by a device based on a user input sensed by the device, setting the selected at least one window to a non-traceable mode, and restricting storage of data generated according to execution of the application in the at least one window set to the non-traceable mode.

In accordance with another aspect of the present disclosure, a method for executing an application may further include determining whether the user input corresponds to a preset gesture, wherein the selecting of the at least one of the plurality of windows may include selecting at least one of the plurality of windows when the user input corresponds to the preset gesture.

In accordance with another aspect of the present disclosure, a method for executing an application may further include executing the application selected among a plurality of applications executable by the device in any one of the at least one window set to the non-traceable mode.

In accordance with another aspect of the present disclosure, a method for executing an application may further include requesting user authentication information, wherein the executing of the application selected among the plurality of applications may include executing the selected application in any one of the at least one window set to the non-traceable mode when the user authentication information received according to the request corresponds to pre-stored user authentication information.

In accordance with another aspect of the present disclosure, a method for executing an application may further include calculating a privacy probability of the application based on information about a mode of a window in which the application is currently-executed and previously executed, and executing the application having the calculated privacy probability greater than a threshold value in any one of the at least one window set to the non-traceable mode.

In accordance with another aspect of the present disclosure, a method for executing an application may further include displaying a message for checking whether to execute the application having the calculated privacy probability greater than the threshold value in any one of the at least one window set to the non-traceable mode.

In accordance with another aspect of the present disclosure, a method for executing an application may further include acquiring a user input for requesting a mode conversion of the at least one window set to the non-traceable mode, setting the at least one window set to the non-traceable mode to a traceable mode, and storing data generated according to execution of the application in the at least one window set to the traceable mode.

In accordance with another aspect of the present disclosure, a method for executing an application may further include displaying the plurality of windows when at least two applications are selected among a plurality of applications executable by the device.

In accordance with another aspect of the present disclosure, a method for executing an application may further include displaying identification information indicating that the at least one window is set to the non-traceable mode or is set to the traceable mode, in each of the at least one window.

In accordance with another aspect of the present disclosure, a device for executing an application is provided. The device includes a display unit configured to display a plurality of windows, and a control unit configured to select at least one of the plurality of windows based on a user input, set the selected at least one window to a non-traceable mode, and restrict storage of data generated according to execution of the application in the at least one window set to the non-traceable mode.

In accordance with another aspect of the present disclosure, a control unit may determine whether the user input corresponds to a preset gesture, and select at least one of the plurality of windows when the user input corresponds to the preset gesture.

In accordance with another aspect of the present disclosure, a control unit may execute the application selected among a plurality of applications executable by the device in any one of the at least one window set to the non-traceable mode.

In accordance with another aspect of the present disclosure, a display unit may display a message for requesting user authentication information, and the control unit may execute the selected application in any one of the at least one window set to the non-traceable mode when the user authentication information received according to the request corresponds to pre-stored user authentication information.

In accordance with another aspect of the present disclosure, a control unit may calculate a privacy probability of the application based on information about a mode of a window in which the application is currently-executed and previously executed, and execute the application having the calculated privacy probability greater than a threshold value in any one of the at least one window set to the non-traceable mode.

In accordance with another aspect of the present disclosure, a display unit may display a message for checking whether to execute the application having the calculated privacy probability greater than the threshold value in any one of the at least one window set to the non-traceable mode.

In accordance with another aspect of the present disclosure, a display unit may acquire a user input for requesting a mode conversion of the at least one window set to the non-traceable mode, and the control unit may set the at least one window set to the non-traceable mode to a traceable mode, and store data generated according to execution of the application in the at least one window set to the traceable mode.

In accordance with another aspect of the present disclosure, a display unit may display the plurality of windows when at least two applications are selected among a plurality of applications executable by the device.

In accordance with another aspect of the present disclosure, a display unit may display identification information indicating that the at least one window is set to the non-traceable mode or is set to the traceable mode, in each of the at least one window.

In accordance with another aspect of the present disclosure, a method for executing an application recorded in a non-transitory computer-readable recording medium is provided. The method includes instructions for selecting at least one of a plurality of windows displayed by a device based on a user input sensed by the device, setting the selected at least one window to a non-traceable mode, and restricting storage of data generated according to execution of the application in the at least one window set to the non-traceable mode.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the present disclosure, the term "application" may refer to a set of computer programs for performing particular operations. The applications described herein may vary according to various embodiments of the present disclosure. Examples of the applications may include, but are not limited to, music play applications, video play applications, map applications, memo applications, diary applications, messenger applications, call applications, phone book applications, broadcast applications, exercise support applications, payment applications, and picture folder applications.

Figure 1:
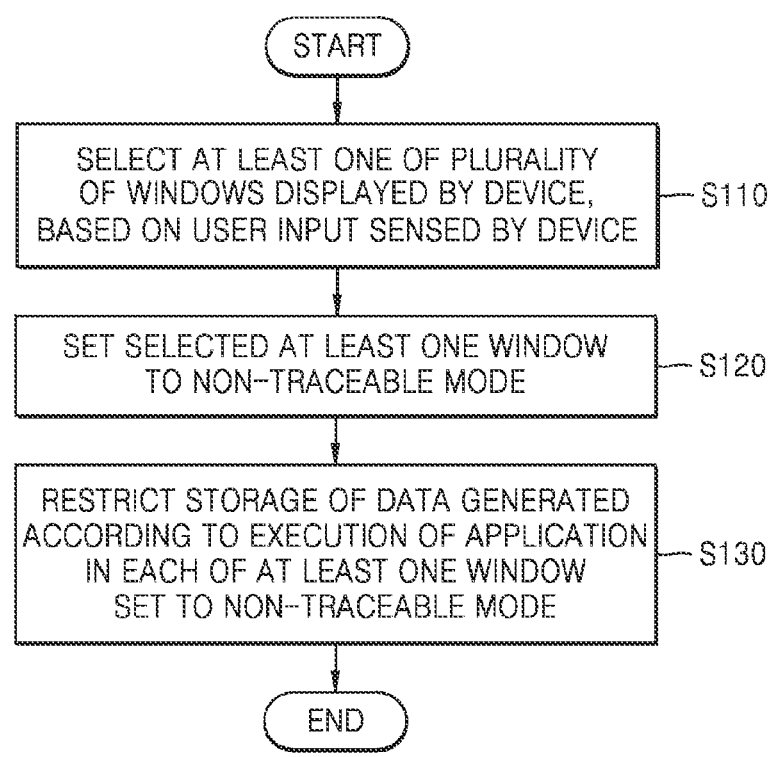
FIG. 1 is a flowchart illustrating a method for executing an application according to an embodiment of the present disclosure.

FIG. 1 is a flowchart illustrating a method for executing an application according to an embodiment of the present disclosure.

Referring to FIG. 1, in operation S110, an application executing device (hereinafter, referred to as "device") may select at least one of a plurality of windows displayed by the device based on a user input sensed by the device.

The device according to an embodiment of the present disclosure may execute at least one application. For example, the device may execute an application selected by a user among a plurality of executable applications. In the device, data generated according to the execution of the application may be displayed on a window displayed by the device.

The device according to an embodiment of the present disclosure may display a plurality of windows. Herein, the window may refer to at least a partial region on the screen of the device in which the generated data is displayed during the execution of the application. The device may display the data generated according to the execution of at least one application in each of the windows. Hereinafter, displaying the data generated according to the execution of the application on the window will be described as executing the application in the window.

The device according to an embodiment of the present disclosure may sense a user input. Herein, the user input may be generated by a particular operation performed by the user. In the present disclosure, the particular operation performed by the user will be described as a gesture. For example, the gesture may include a drag input and a touch input that are generated when a portion of the body of the user contacts the device, but embodiments are not limited thereto. In other embodiments of the present disclosure, the gesture may include any number of particular operations of the user that are performed within a predetermined distance from the device. For example, the device may sense an operation of the user, which is performed to draw a "V" or "check" shape at a position spaced apart from the device by a predetermined distance with a finger, as a user input.

When the user input is sensed, the device may select at least one of the windows in which the application is executed. For example, the device may select a window corresponding to a position at which a drag input of the user is sensed, among the plurality of windows. As another example, the device may display a user interface (UI) for selecting any one of the windows on the screen. A text or an image representing each of the windows may be displayed on the UI. On the UI, the device may select the window corresponding to the position at which the user input is sensed.

In operation S120, the device may set the selected at least one window to a non-traceable mode.

The device according to an embodiment of the present disclosure may select any one of a traceable mode that stores the data generated during the execution of the application and a non-traceable mode that does not store the data generated during the execution of the application.

Also, when a plurality of windows are displayed, the device may set the mode of each of the windows to any one of the traceable mode and the non-traceable mode. For example, when a first window and a second window are displayed by the device, the device may set the first window to the non-traceable mode and may set the second window to the traceable mode. Herein, it is assumed that the basic mode of each of the windows is set to the traceable mode.

In operation S130, the device may restrict the storage of the data generated according to the execution of the application in the at least one window set to the non-traceable mode.

The device according to an embodiment of the present disclosure may not store the data of the application played on the window operating in the non-traceable mode by operating the particular window in the non-traceable mode when the application is directed to the particular window using the user input. For example, the device may restrict the storage of the data of a messenger application executed in the first window set to the non-traceable mode. While the first window is set to the non-traceable mode, the device may not store a message that is received or transmitted by the device.

The device stores the data of a music play application executed in the second window that is set to the traceable mode. For example, the device may store a play list of music files output from the music play application.

By the non-traceable mode, the device according to an embodiment of the present disclosure may protect the privacy of the user by not storing the personal information of the user.

Also, according to an embodiment of the present disclosure, the device may further request user authentication information from the user after sensing the user input. By requesting the user authentication information, the device may determine whether the request for conversion from the traceable mode to the non-traceable mode is made by the user or a user authorized to do so. The user authentication information may include biometric information such as a fingerprint and a password that is preset by the user of the device, but embodiments of the user authentication information are not limited thereto.

According to an embodiment of the present disclosure, according to the user's selection, the device may delete the data stored according to the execution of the application in the window set to the traceable mode.

The device according to an embodiment of the present disclosure may include a smart phone, a personal digital assistant (PDA), a mobile personal computer (PC), a laptop computer, a tablet computer, a phablet computer, a desktop computer, a communicator, and a wearable device.

Figure 2A:
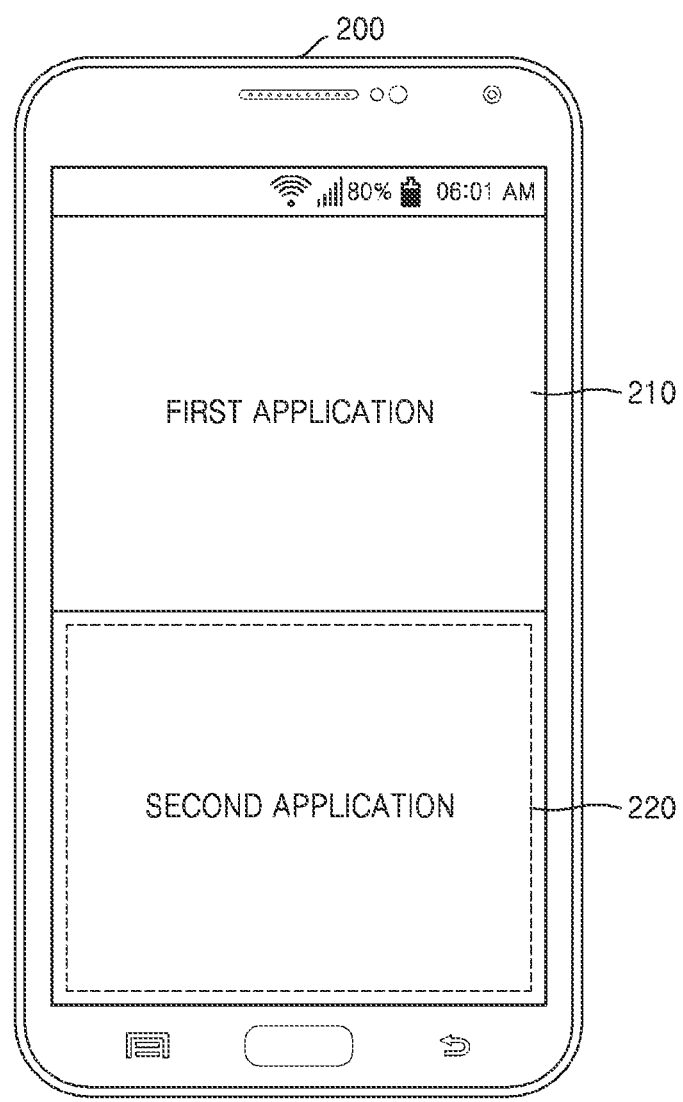
FIGS. 2A, 2B, and 2C are diagrams illustrating a plurality of windows displayed by a device according to an embodiment of the present disclosure.
Figure 2B:
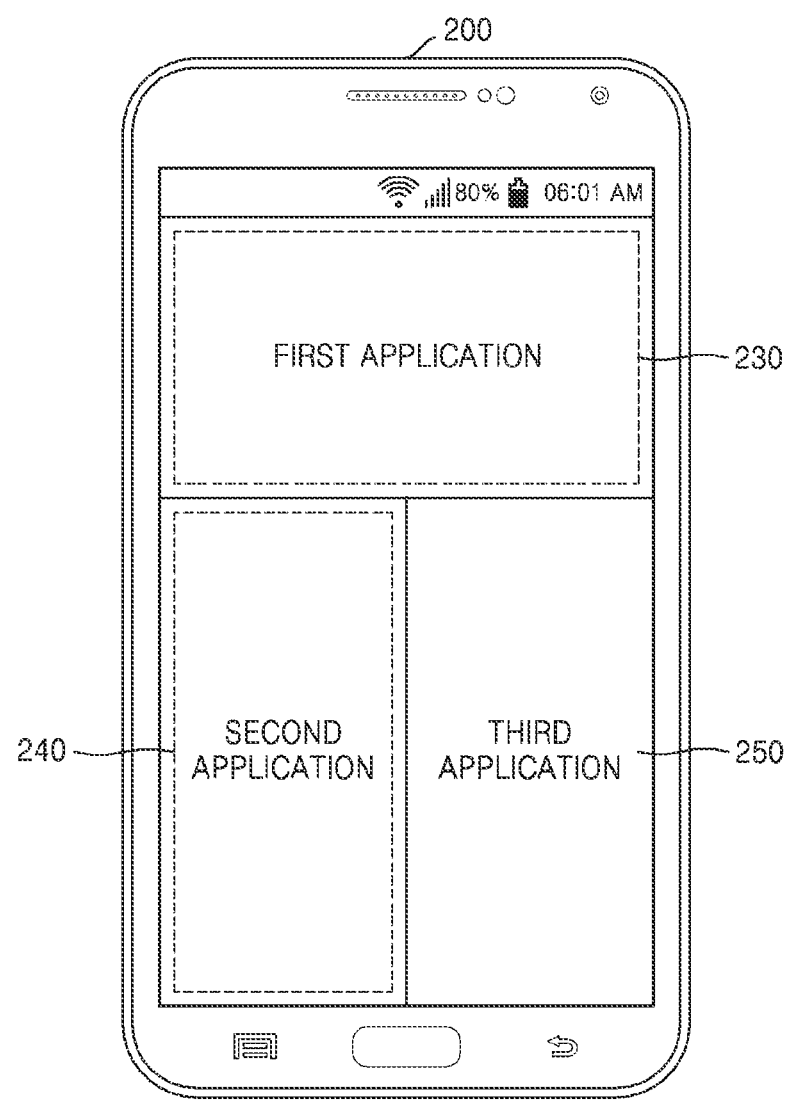
Figure 2C:
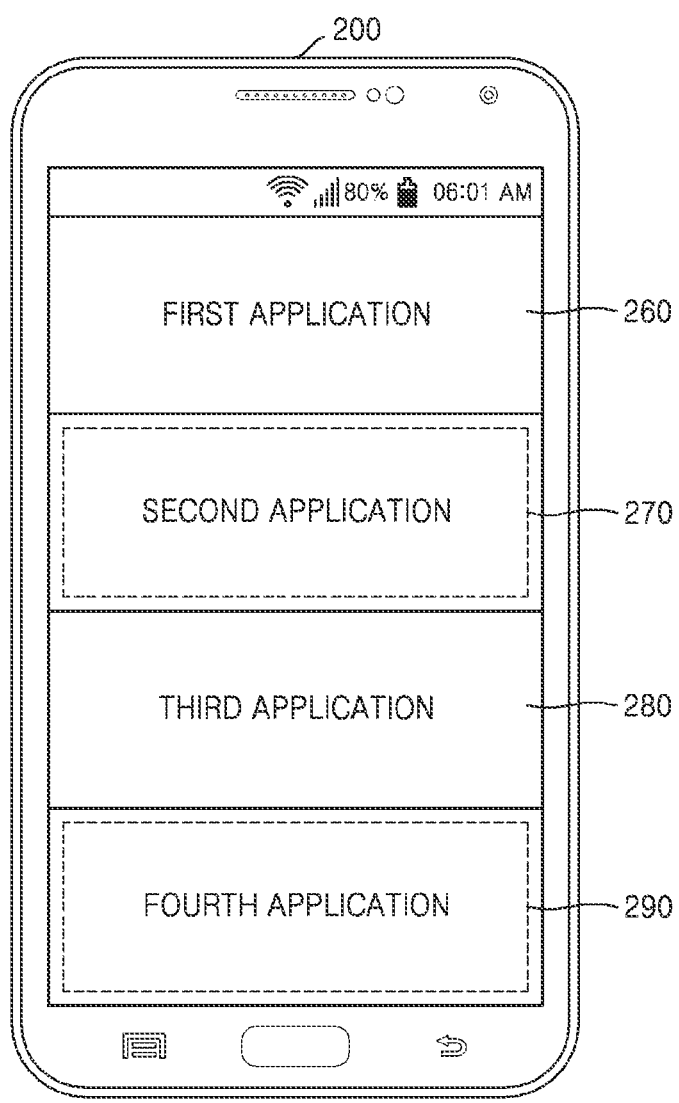

FIGS. 2A to 2C are diagrams illustrating a plurality of windows displayed by a device 200 according to an embodiment of the present disclosure.

Referring to FIG. 2A, the diagram illustrates a screen of the device 200 displaying two windows 210 and 220 according to an embodiment of the present disclosure. Data about two applications executed by the device 200 may be displayed in the two windows 210 and 220 displayed by the device 200. Herein, the two windows 210 and 220 may be set to respective independent modes. For example, the first window 210 may be set to the traceable mode, and the second window 220 may be set to the non-traceable mode but embodiments are not limited thereto, and any number, arrangement and mode setting of windows may be provided.

According to an embodiment of the present disclosure, the device 200 may store the data of a first application executed in the first window 210 set to the traceable mode. The device 200 may not store the data of a second application executed in the second window 220 set to the non-traceable mode.

In order to identify the mode of each of the windows, the device 200 may display different identification information in the first window 210 set to the traceable mode and in the second window 220 set to the non-traceable mode. For example, the device 200 may display the first window 210 and the second window 220 in different colors, shades or brightness. As another example, the device 200 may display an icon representing the non-traceable mode in the second window 220, but embodiments of the identification information are not limited thereto.

In order to protect the privacy of the user, the device 200 according to an embodiment of the present disclosure may change the mode of each of the windows according to a sensed user input.

Referring to FIG. 2B, the diagram illustrates another screen of the device 200 displaying three windows 230, 240, and 250 according to an embodiment of the present disclosure. Data about three applications executed by the device 200 may be displayed in the three windows 230, 240, and 250 displayed by the device 200. Herein, the three windows 230, 240, and 250 may be set to respective independent modes. For example, the first window 230 in which a first application is executed and the second window 240 in which a second application is executed may be set to the non-traceable mode. Also, the third window 250 in which a third application is executed may be set to the traceable mode but embodiments are not limited thereto, and any number, arrangement and mode setting of windows may be provided.

Referring to FIG. 2C, the diagram illustrates another screen of the device 200 displaying four windows 260, 270, 280, and 290 according to an embodiment of the present disclosure. Data about four applications executed by the device 200 may be displayed in the four windows 260, 270, 280, and 290 displayed by the device 200. Herein, the four windows 260, 270, 280, and 290 may be set to respective independent modes. For example, the first window 260 in which a first application is executed and the third window 280 in which a third application is executed may be set to the traceable mode. Also, the second window 270 in which a second application is executed and the fourth window 290 in which a fourth application is executed may be set to the non-traceable mode but embodiments are not limited thereto, and any number, arrangement and mode setting of windows may be provided.

By setting at least one of the windows to the non-traceable mode, the device according to an embodiment of the present disclosure may protect the privacy of the user with respect to the application executed in the window set to the non-traceable mode. For example, the device may restrict the storage of the data of the application by setting a private session for the window set to the non-traceable mode.

FIGS. 3A to 3D are diagrams illustrating a method for executing a message application in a window set to a non-traceable mode among a plurality of windows by a device according to an embodiment of the present disclosure.

Figure 3A:
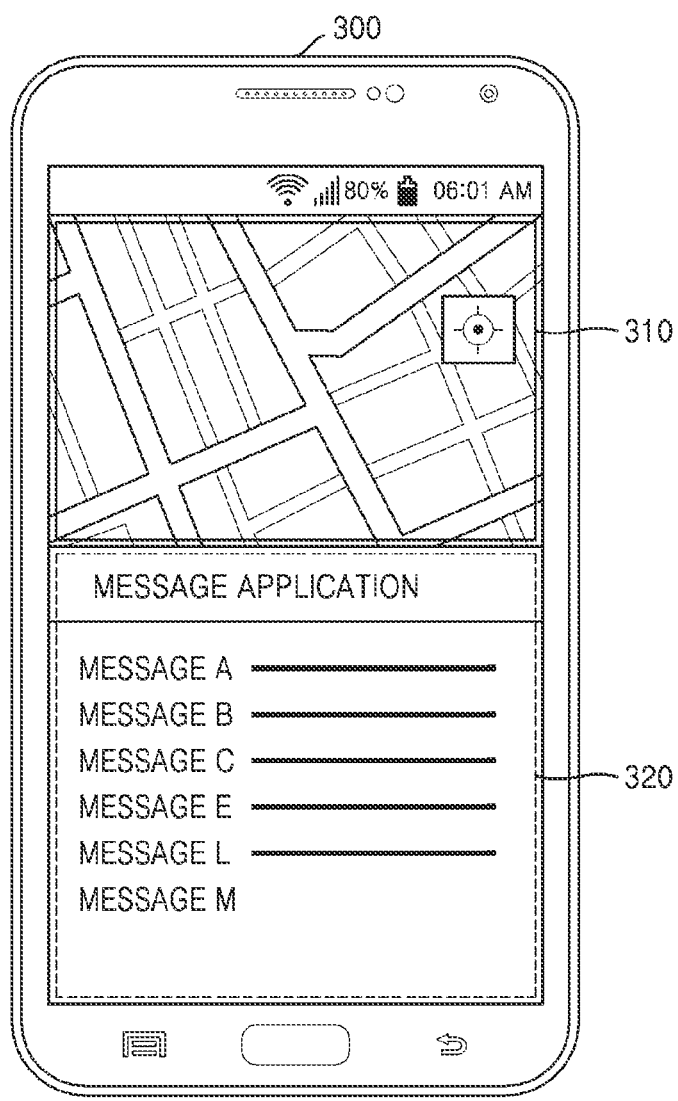
FIGS. 3A, 3B, 3C, and 3D are diagrams illustrating a method for executing a message application in a window set to a non-traceable mode among a plurality of windows by a device according to an embodiment of the present disclosure.

Referring to FIG. 3A, a device 300 according to an embodiment of the present disclosure may execute a map application in a first window 310 displayed at an upper end of the screen. Also, the device 300 may execute a message application in a second window 320 displayed at a lower end of the screen. Herein, the first window 310 may be set to the traceable mode, and the second window 320 may be set to the non-traceable mode but embodiments are not limited thereto, and any number, arrangement and mode setting of windows may be provided.

Figure 3B:
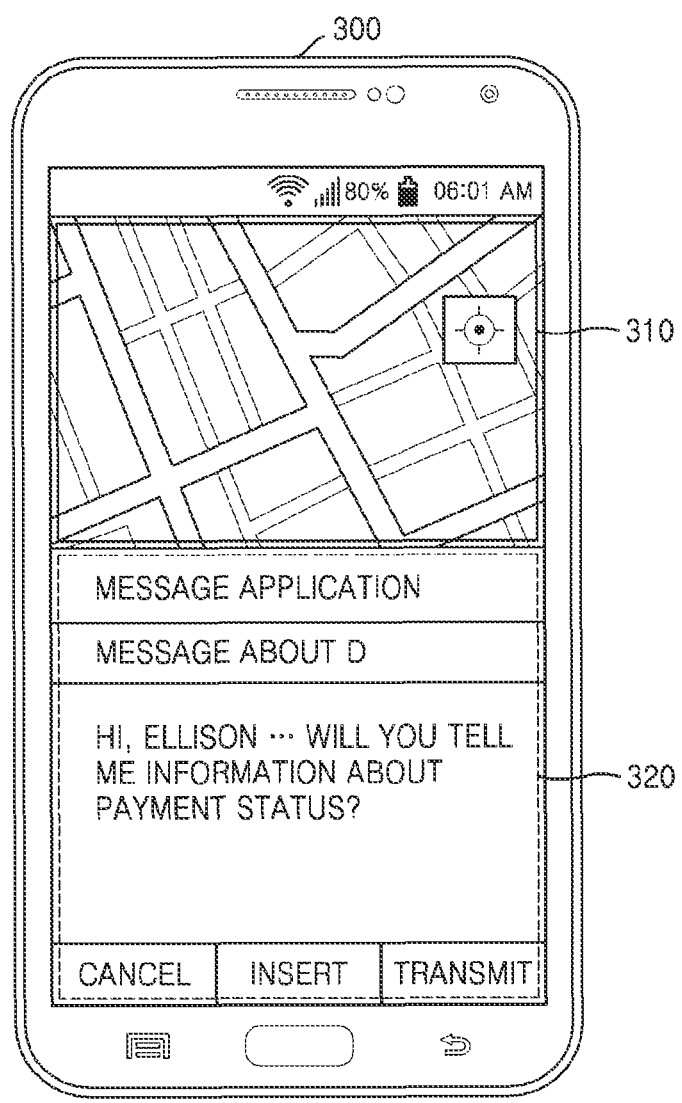

Referring to FIG. 3B, the device 300 according to an embodiment of the present disclosure may display text data, which is input by the user to transmit a message to destination "D", in the second window 320. Since the second window 320 is set to the non-traceable mode, the device 300 may not store the text data input by the user.

Figure 3C:
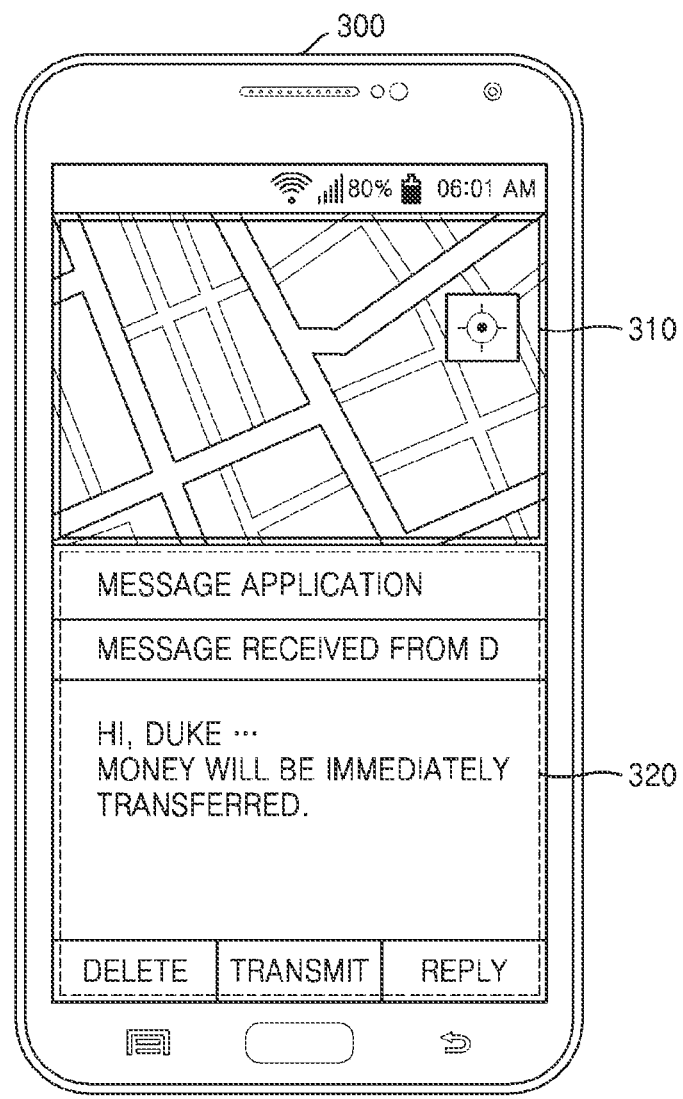

Referring to FIG. 3C, the device 300 according to an embodiment of the present disclosure may display a message, which is received from D, in the second window 320. Since the second window 320 is set to the non-traceable mode, the device 300 may not store the text data of the message received from D.

Figure 3D:
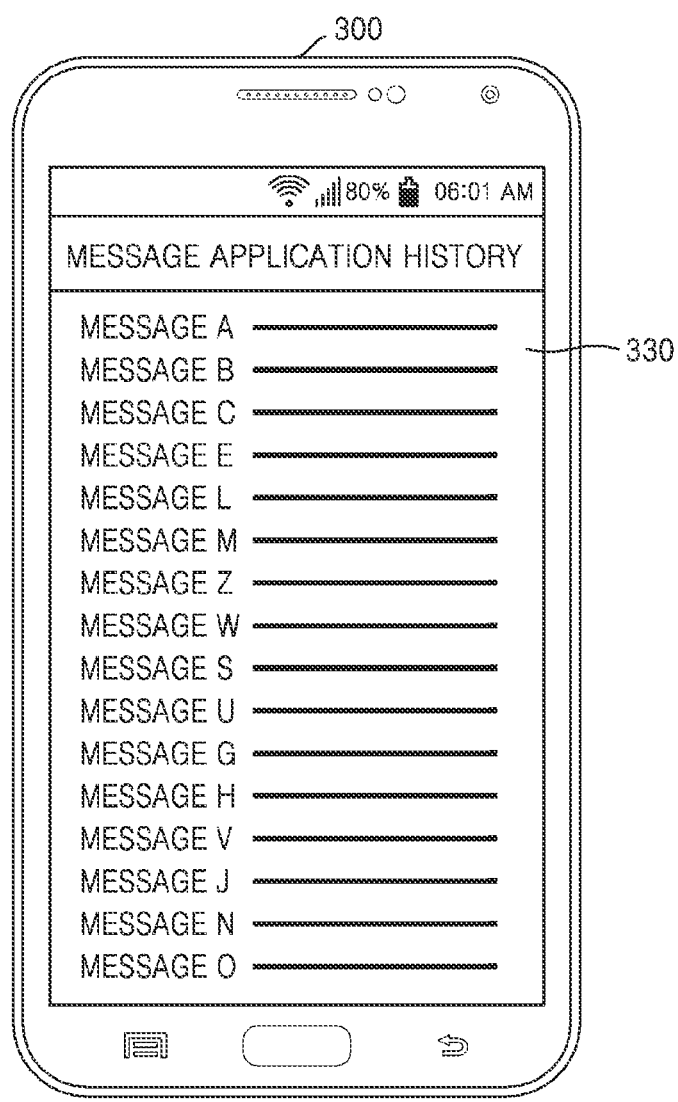

Referring to FIG. 3D, the device 300 may display a list 330 of messages transmitted/received through the message application. According to an embodiment of the present disclosure, since the storage of data is restricted while the second window 320 is set to the non-traceable mode, data about the messages communicated between the user and D may not be included in the list 330 of messages.

Figure 4A:
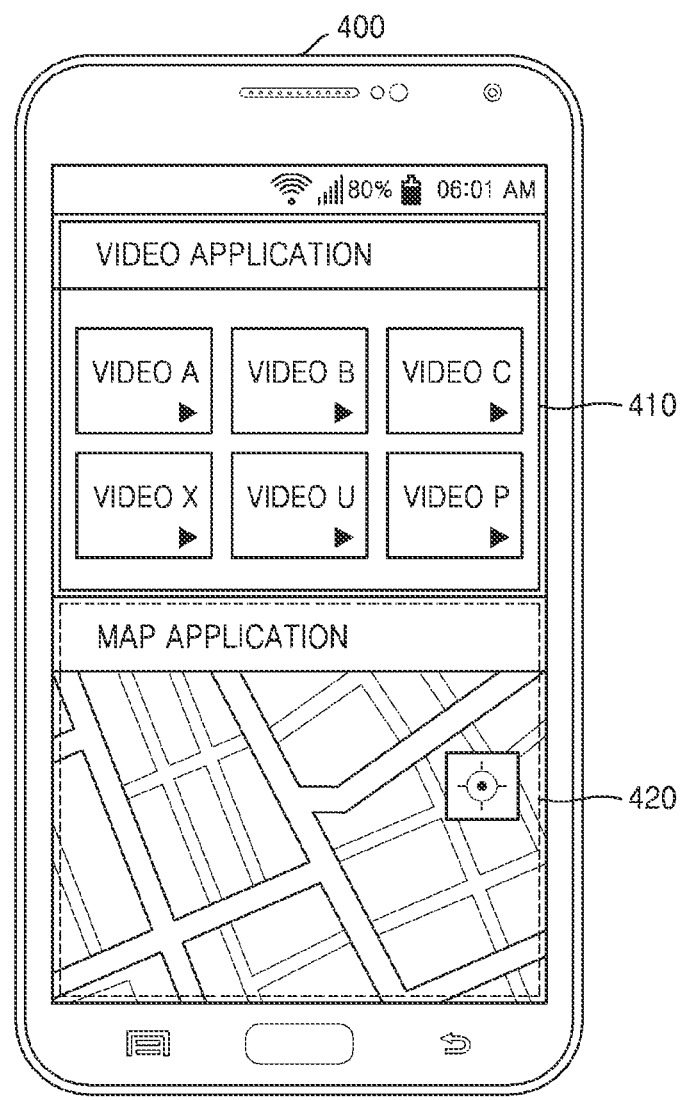
FIGS. 4A, 4B, and 4C are diagrams illustrating a method for executing a map application in a window set to a non-traceable mode among a plurality of windows by a device according to an embodiment of the present disclosure.
Figure 4B:
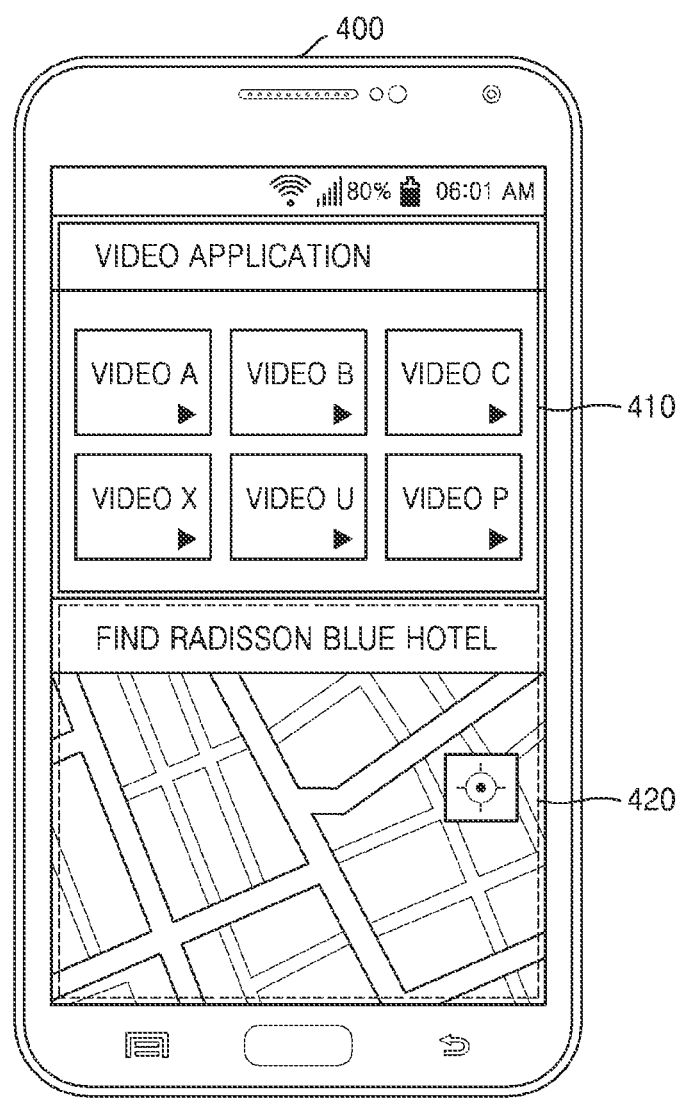
Figure 4C:
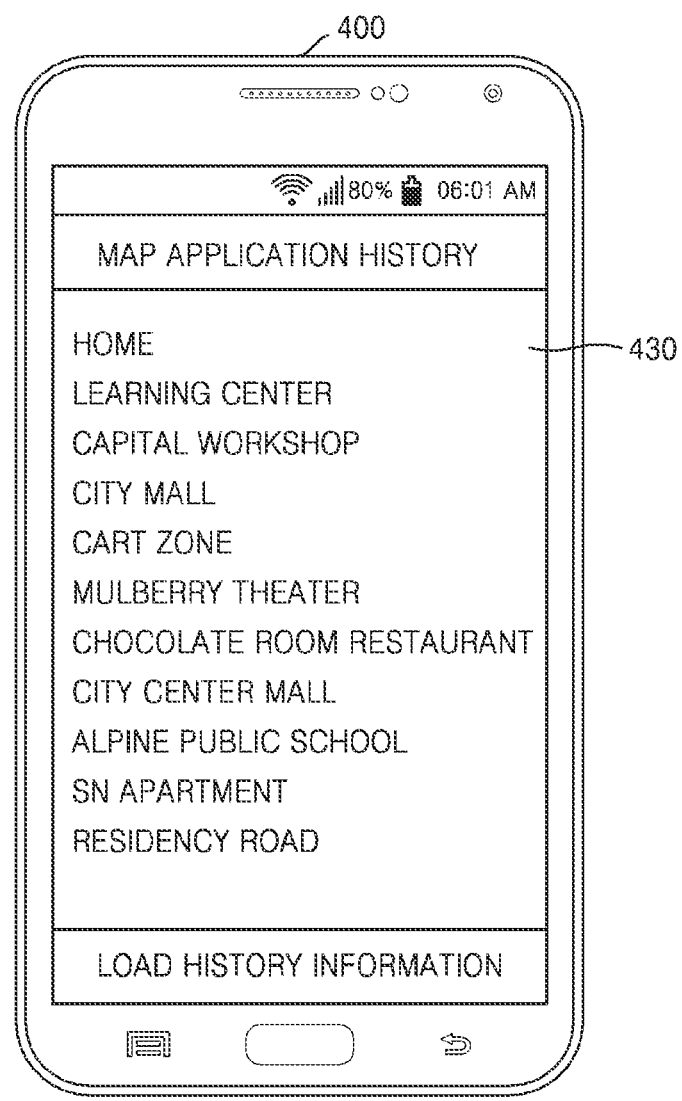

FIGS. 4A to 4C are diagrams illustrating a method for executing a map application in a window set to a non-traceable mode among a plurality of windows by a device according to an embodiment of the present disclosure.

Referring to FIG. 4A, a device 400 according to an embodiment of the present disclosure may execute a video application in a first window 410 displayed at an upper end of the screen. The device 400 may also execute a map application in a second window 420 displayed at a lower end of the screen. Herein, the first window 410 may be set to the traceable mode, and the second window 420 may be set to the non-traceable mode but embodiments are not limited thereto, and any number, arrangement and mode setting of windows may be provided.

Referring to FIG. 4B, the device 400 according to an embodiment of the present disclosure may display the text data "Find Radisson Blue Hotel", which is input by the user to find the location of the Radisson Blue Hotel in the map application in the second window 420. Since the second window 420 is set to the non-traceable mode, the device 400 may not store the text data input by the user.

Referring to FIG. 4C, the device 400 may display a list 430 including data about the places found through the map application. According to an embodiment of the present disclosure, since the storage of data is restricted while the second window 420 is set to the non-traceable mode, the information about the Radisson Blue Hotel requested by the user may not be included in the list 430.

FIGS. 5A to 5D are diagrams illustrating a method for executing a video application in a window set to a non-traceable mode among a plurality of windows by a device according to an embodiment of the present disclosure.

Figure 5A:
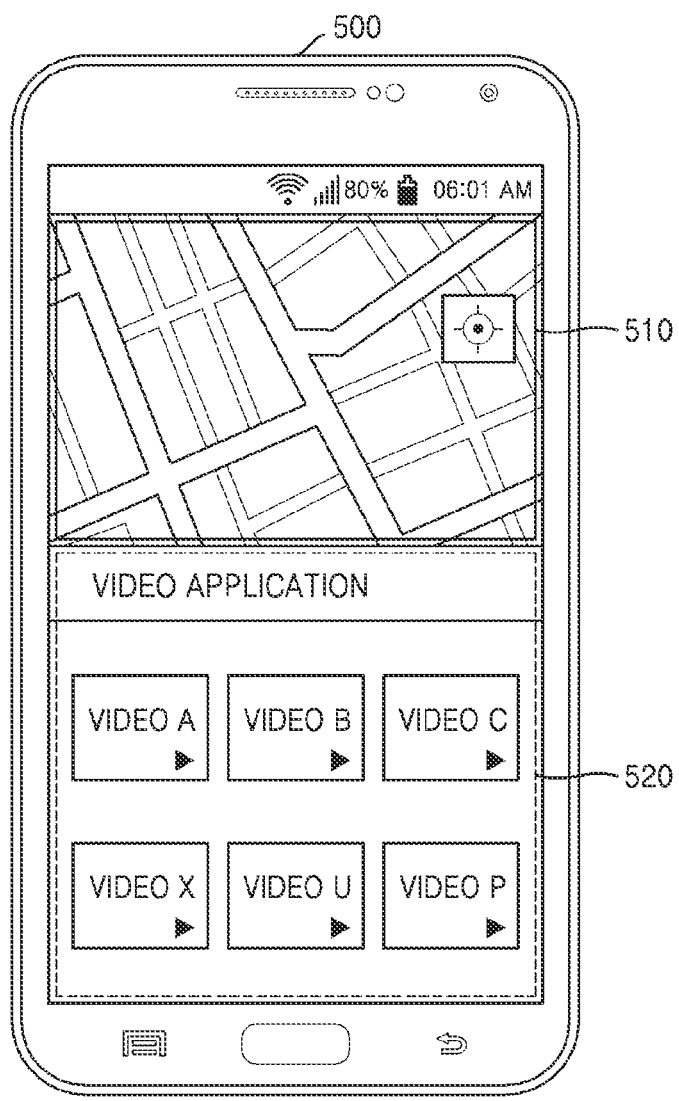
FIGS. 5A, 5B, 5C, and 5D are diagrams illustrating a method for executing a video application in a window set to a non-traceable mode among a plurality of windows by a device according to an embodiment of the present disclosure.

Referring to FIG. 5A, a device 500 according to an embodiment of the present disclosure may execute a map application in a first window 510 displayed at an upper end of the screen. Also, the device 500 may execute a video application in a second window 520 displayed at a lower end of the screen. Herein, the first window 510 may be set to the traceable mode, and the second window 520 may be set to the non-traceable mode but embodiments are not limited thereto, and any number, arrangement and mode setting of windows may be provided.

Figure 5B:
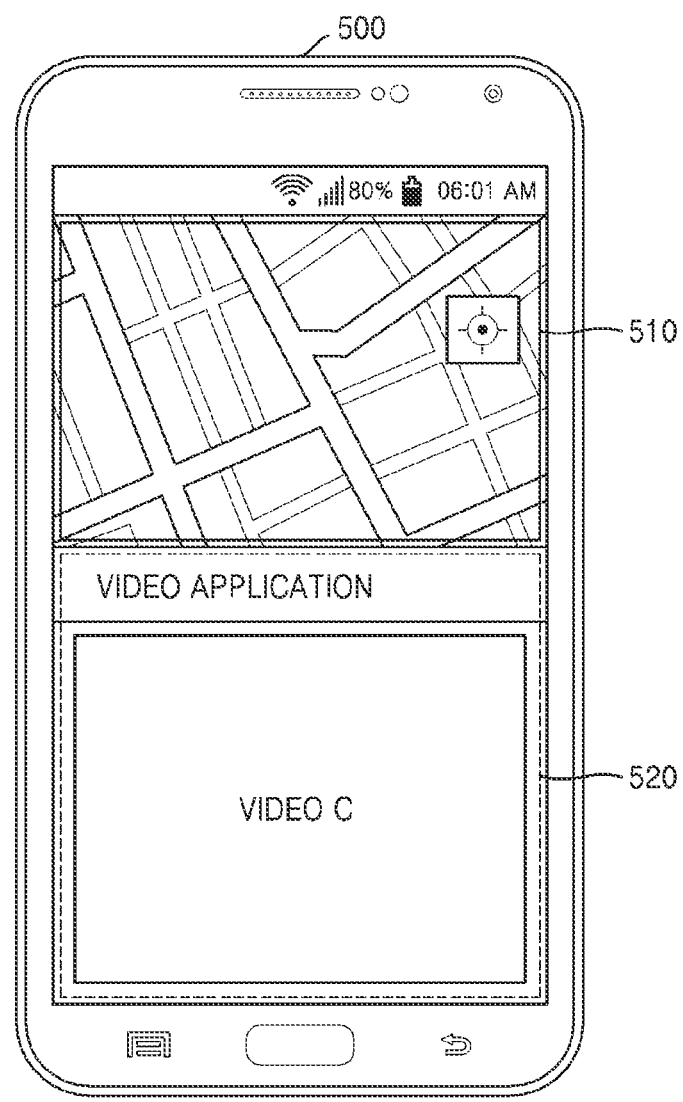

Referring to FIG. 5B, the device 500 according to an embodiment of the present disclosure may display a video C which is selected by the user, on the second window 520 set to the non-traceable mode. Since the second window 520 is set to the non-traceable mode, the device 500 may not store information about the selection and play of the video C.

Figure 5C:
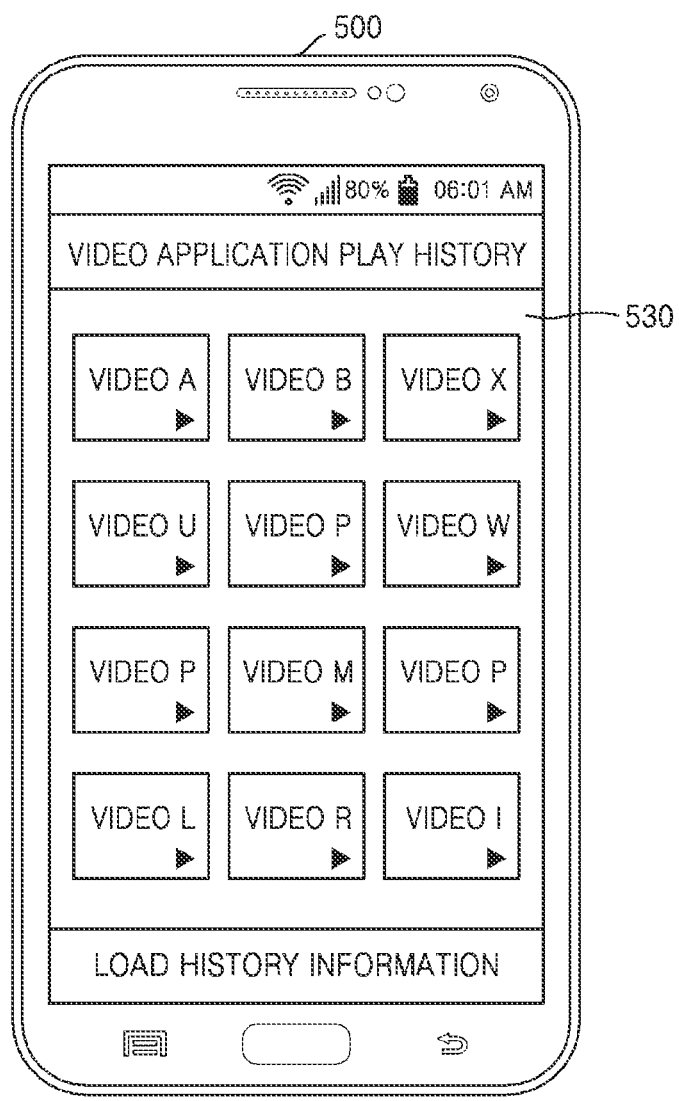

Referring to FIG. 5C, the device 500 may display a list 530 including information about the played videos. According to an embodiment of the present disclosure, since the storage of data is restricted while the second window 520 is set to the non-traceable mode, information about the selection and play of the video C may not be included in the list 530.

Figure 5D:
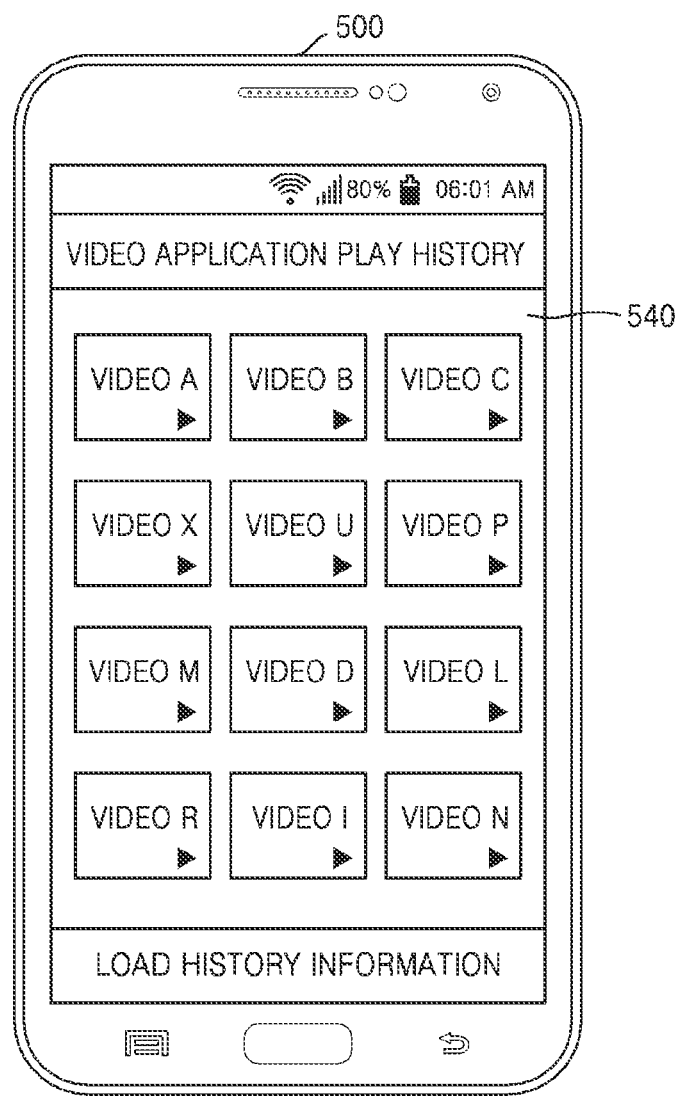

FIG. 5D illustrates a list 540 that is generated when the device 500 plays the video C in the first window 510 set to the traceable mode. When the video C is played in the first window 510 set to the traceable mode, information about the selection and play of the video C may be stored in the device 500. Accordingly, the information about the video C may be included in the list 540 including the information about the selection and play of the video C.

Figure 6:
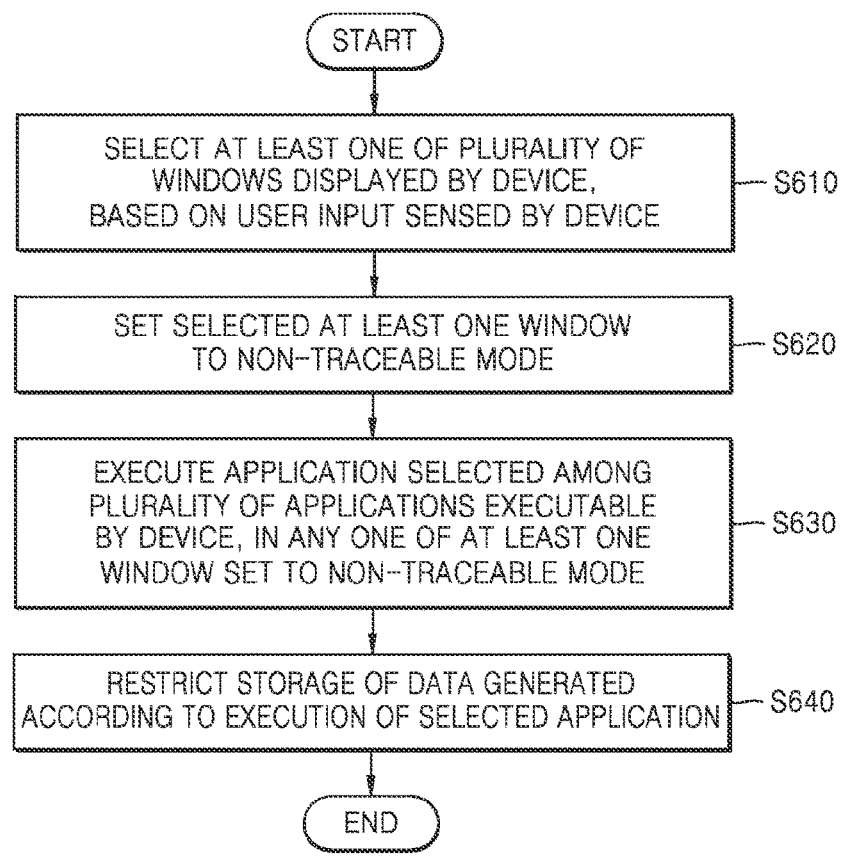
FIG. 6 is a flowchart illustrating a method for changing a window in which an application is executed, by a device according to an embodiment of the present disclosure so that an application executed in a window set to a traceable mode may be executed in a window set to a non-traceable mode.

FIG. 6 is a flowchart illustrating a method for changing a window in which an application is executed, by a device according to an embodiment of the present disclosure so that an application executed in a window set to a traceable mode may be executed in a window set to a non-traceable mode.

Referring to FIG. 6, in operation S610, the device may select at least one of a plurality of windows displayed by the device based on a user input sensed by the device. Herein, at least one application may be executed in the plurality of windows. Operation S610 may correspond to operation S110 described above with reference to FIG. 1.

In operation S620, the device may set the selected at least one window to the non-traceable mode.

The device according to an embodiment of the present disclosure may set at least one window selected from the windows set from the traceable mode to the non-traceable mode, and may set at least one window selected from the windows set from the non-traceable mode to the traceable mode.

In order for the user to identify the window set to the non-traceable mode, the device may display identification information representing the non-traceable mode in the window set to the non-traceable mode. Further, in order for the user to identify the window set to the traceable mode, the device may display identification information representing the traceable mode in the window set to the traceable mode.

In operation S630, the device may execute the application selected among a plurality of applications executable by the device in any one of the at least one window set to the non-traceable mode.

The device according to an embodiment of the present disclosure may select any one of the executable applications through a menu bar displayed at one side of the screen of the device. For example, the device may select an application corresponding to an icon selected by the user among the icons of the applications displayed in the menu bar. The device may execute the selected application in the window set to the non-traceable mode.

As another example, the device may execute an application of the window set to the traceable mode, in the window set to the non-traceable mode. For example, when sensing a drag input of the user from a first point on the first window set to the traceable mode to a second point on the second window set to the non-traceable mode, the device may execute the application of the first window, in the second window.

In operation S640, the device may restrict the storage of the data generated according to the execution of the selected application. The device according to an embodiment of the present disclosure may restrict the storage of the data generated from the starting time point to the ending time point of the execution of the selected application in the window set to the non-traceable mode.

FIGS. 7A to 7E are diagrams illustrating a method for changing a window in which an application is executed, by a device according to an embodiment of the present disclosure so that an application executed in a window set to a traceable mode may be executed in a window set to a non-traceable mode.

Figure 7A:
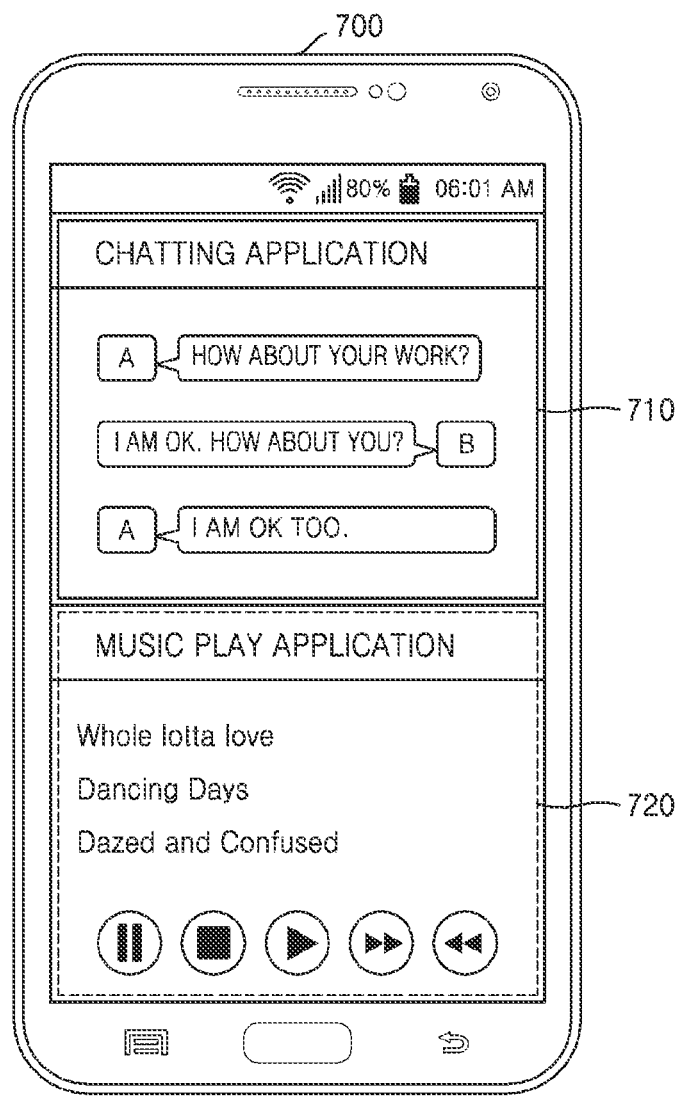
FIGS. 7A, 7B, 7C, 7D, and 7E are diagrams illustrating a method for changing a window in which an application is executed, by a device according to an embodiment of the present disclosure so that an application executed in a window set to a traceable mode may be executed in a window set to a non-traceable mode.

Referring to FIG. 7A, a device 700 according to an embodiment of the present disclosure may execute a chatting application in a first window 710 displayed at an upper end of the screen. Also, the device 700 may execute a music play application in a second window 720 displayed at a lower end of the screen. Herein, the first window 710 may be set to the traceable mode, and the second window 720 may be set to the non-traceable mode but embodiments are not limited thereto, and any number, arrangement and mode setting of windows may be provided.

Figure 7B:
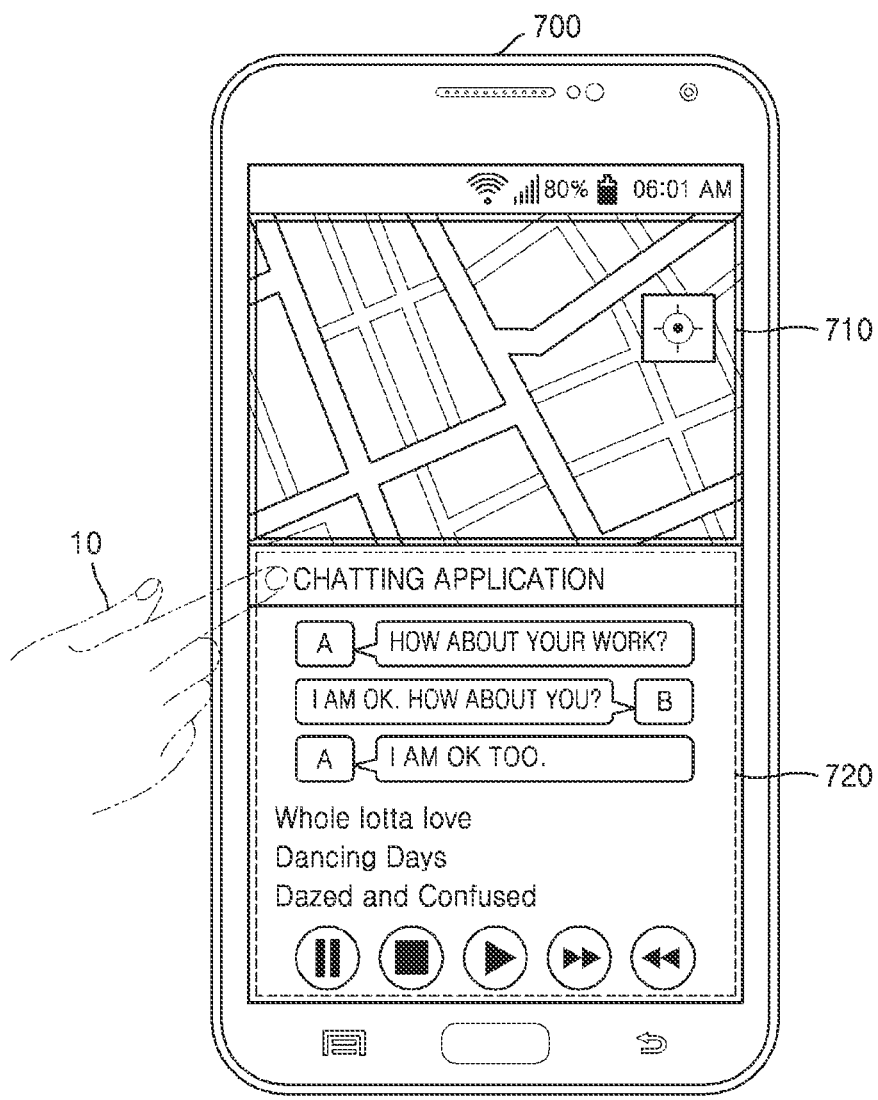

Referring to FIG. 7B, the device 700 according to an embodiment of the present disclosure may sense a first gesture of the user for changing the window in which the chatting application is executed, from the first window 710 to the second window 720. For example, the device 700 may sense a gesture of the user including movement of a user's finger 10 toward the lower end of the device 700 while touching a point of the first window 710 with the finger 10.

Figure 7C:
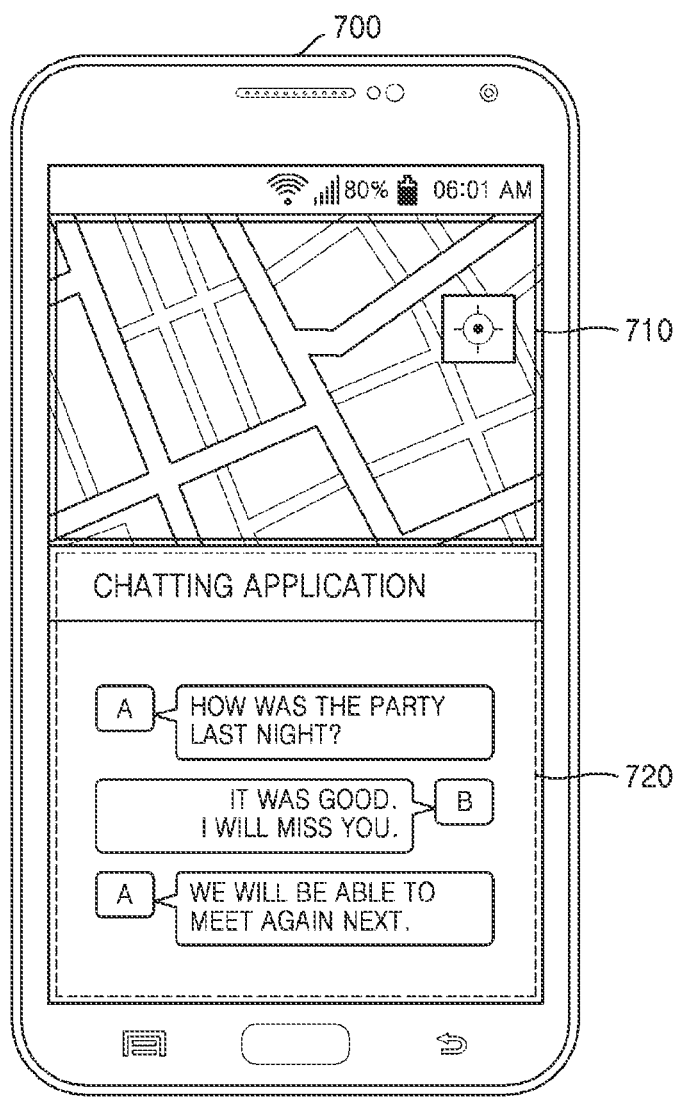

Referring to FIGS. 7B and 7C, when sensing the gesture of the user, the device 700 according to an embodiment of the present disclosure may execute the chatting application in the second window 720 set to the non-traceable mode. The device 700 may not store data about the chatting application from the starting time point of the execution of the chatting application in the second window 720 set to the non-traceable mode.

Figure 7D:
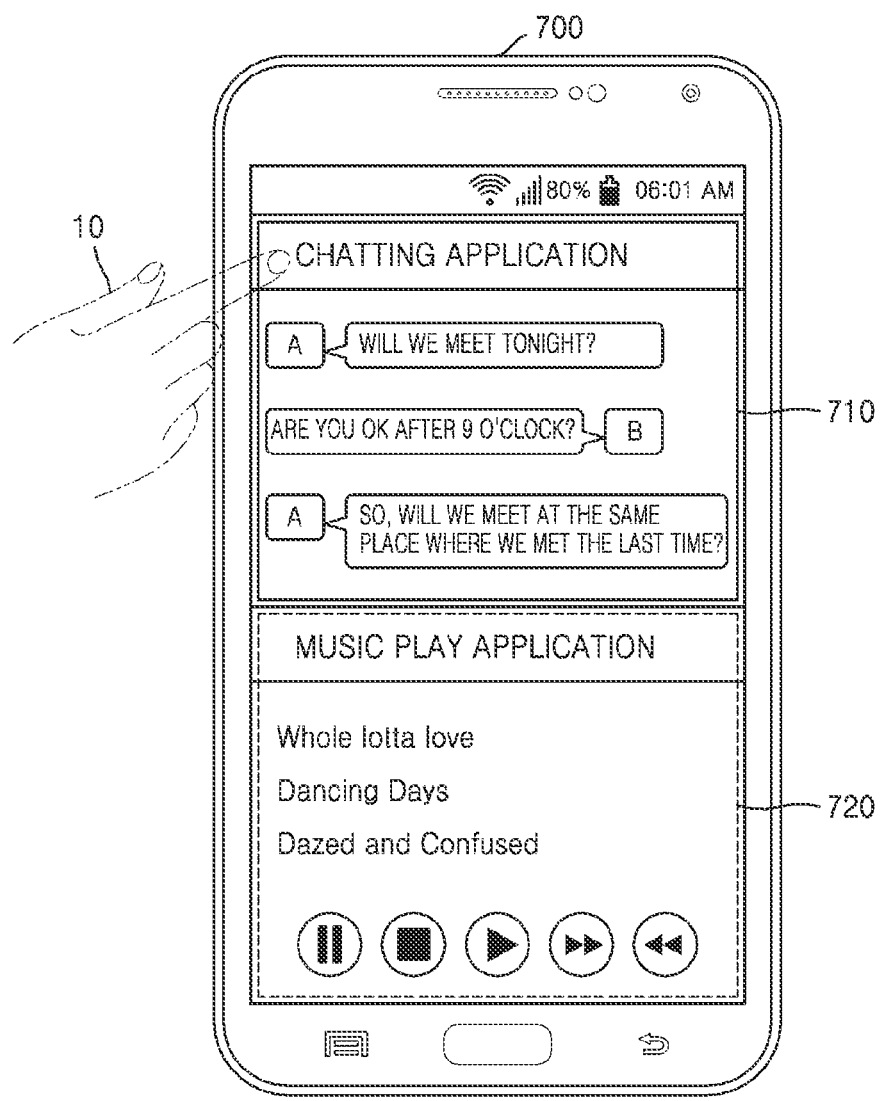

Referring to FIG. 7D, the device 700 according to an embodiment of the present disclosure may sense a second gesture of the user for changing the window in which the chatting application is executed, from the second window 720 back to the first window 710. For example, the device 700 may sense a gesture of the user including movement of the user's finger 10 toward the upper end of the device 700 while touching a point of the second window 720 with the finger 10. The device 700 may store data about the chatting application from the starting time point of the execution of the chatting application in the first window 710 set to the traceable mode.

Since the chatting application of the device 700 is executed in the first window 710, the previously-executed music play application may be re-executed in the second window 720.

Figure 7E:
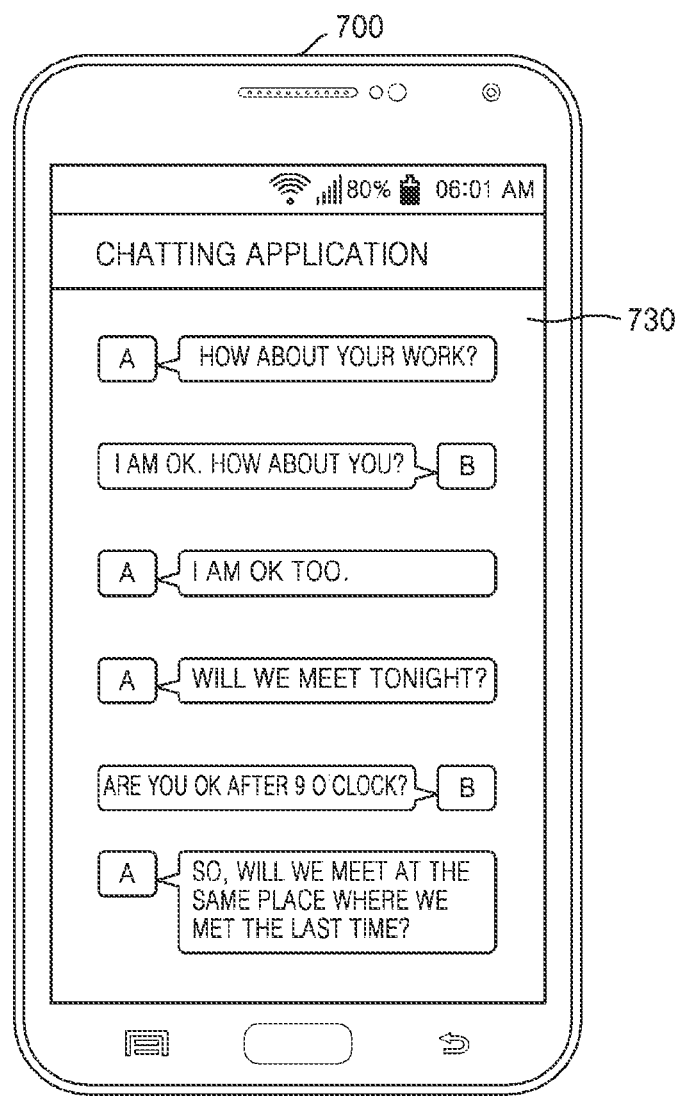

Referring to FIG. 7E, the device 700 may display a list 730 including information about the data transmitted/received through the chatting application. The device 700 according to an embodiment may restrict the storage of the data generated during the execution of the chatting application in the second window 720 set to the non-traceable mode. Accordingly, information about the data transmitted/received during the execution of the chatting application in the second window 720 may not be included in the list 730.

Figure 8:
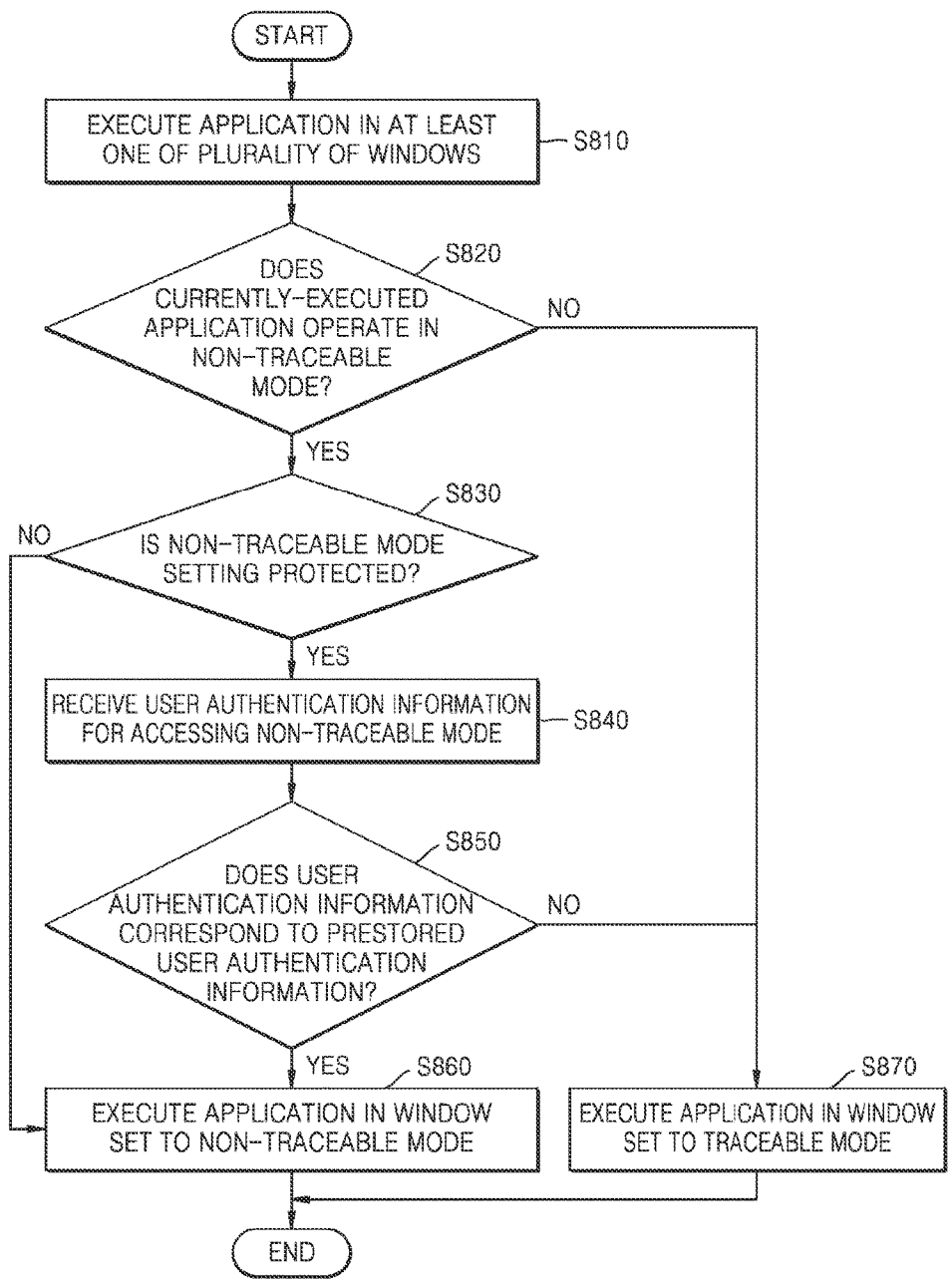
FIG. 8 is a flowchart illustrating a method for controlling an application executed in each of a plurality of windows by a device according to an embodiment of the present disclosure.

FIG. 8 is a flowchart illustrating a method for controlling an application executed in each of a plurality of windows by a device according to an embodiment of the present disclosure.

Referring to FIG. 8, in operation S810, the device may execute an application in at least one of a plurality of windows. Operation S810 may correspond to operation S110 described above with reference to FIG. 1.

The device according to an embodiment of the present disclosure may execute an application selected by the user among a plurality of executable applications in at least one of a plurality of windows.

In operation S820, the device may determine whether the currently-executed application operates in the non-traceable mode. The device according to an embodiment of the present disclosure may set the window in which the application is executed, to operate in any one of the traceable mode and the non-traceable mode. The device may set the selected at least one window to either the traceable mode or the non-traceable mode according to a sensed user input.

According to an embodiment of the present disclosure, the device may preset a window to operate in the non-traceable mode among the plurality of windows. For example, when two windows are displayed in the screen of the device, the device may set the first window displayed at the upper end of the screen to the traceable mode and may set the second window displayed at the lower end of the screen to the non-traceable mode. The device may execute an application selected by the user in any one of the first window and the second window, in the respective traceable mode and non-traceable mode reflected by the window. If it is detected that the application is to be executed in a window set to the traceable mode in operation S820, the device may execute the application in the window set to the traceable mode in operation S870. If it is detected that the application is to be executed in a window set to the non-traceable mode in operation S820, the device may determine a protection setting in operation S830.

In operation S830, the device may determine whether the non-traceable mode setting is protected. The device according to an embodiment of the present disclosure may protect the non-traceable mode setting in order to prevent the application from being executed in the window set to the non-traceable mode by a third party that is not the user or not authorized by the user to do so. For example, when receiving an input of a gesture for executing the selected application in the window set to the non-traceable mode, the device may display a message for requesting user authentication information. If it is detected that the setting is not protected in operation S830, the device may execute the application in the window set to the non-traceable mode in operation S860. If it is detected that the setting is protected in operation S830, the device may determine an authentication in operation S840.

In operation S840, the device may receive the user authentication information for accessing the non-traceable mode. According to an embodiment of the present disclosure, the user may input the user authentication information in order to execute the application in the window set to the non-traceable mode. For example, the user authentication information may include a password, a passcode, and a passphrase but embodiments of the user authentication information are not limited thereto.

In operation S850, the device may determine whether the received user authentication information corresponds to pre-stored user authentication information. At least one piece of user authentication information may be pre-stored in the device according to an embodiment of the present disclosure.

If the received user authentication information corresponds to pre-stored user authentication information in operation S850, the device may execute the selected application in the window set to the non-traceable mode in operation S860. If the received user authentication information does not correspond to pre-stored user authentication information in operation S850, the device may execute the selected application in the window set to the traceable mode in operation S870.

According to an embodiment of the present disclosure, the device may set a private session in order not to store the data of the application executed in the window set to the non-traceable mode. Accordingly, data related to the application executed in the window set to the non-traceable mode may not be stored in the device. For example, log information and execution history information of the application executed in the window set to the non-traceable mode may not be stored in the device.

The device according to an embodiment of the present disclosure may protect the privacy of the user by executing the application in the window set to the non-traceable mode. For example, when the user communicates a message about the user's business with a user of another device, the user may restrict the storage of the message about the user's business in the device by executing the message application in the window set to the non-traceable mode.

The device according to an embodiment of the present disclosure may maintain the mode of the window as the traceable mode when not sensing a user gesture for changing the mode of the window into the non-traceable mode.

Figure 9:
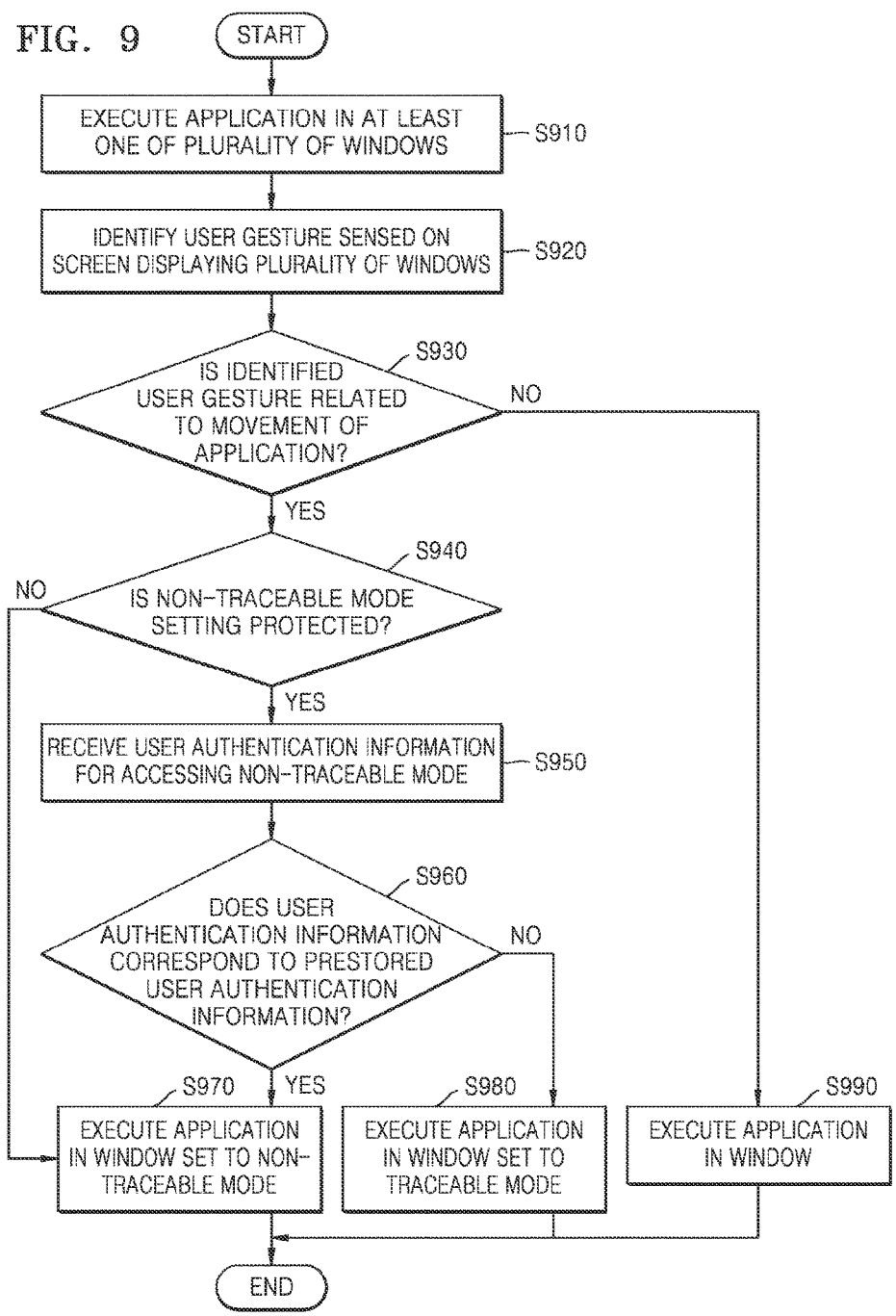
FIG. 9 is a flowchart illustrating a method for changing a window in which an application is executed from a window set to a traceable mode to a window set to a non-traceable mode by a device according to an embodiment of the present disclosure when sensing a user gesture.

FIG. 9 is a flowchart illustrating a method for changing a window in which an application is executed, from a window set to a traceable mode to a window set to a non-traceable mode by a device according to an embodiment of the present disclosure when sensing a user gesture.

Referring to FIG. 9, in operation S910, the device may execute an application in at least one of a plurality of windows. Operation S910 may correspond to operation S110 described above with reference to FIG. 1.

In operation S920, the device may identify a user gesture sensed on a screen displaying the plurality of windows.

In operation S930, the device may determine whether the identified user gesture is related to the movement of the application. If the identified user gesture is related to movement of the application, the device may compare the gesture with pre-stored gestures in operation S940. If the identified user gesture is not related to the movement of the application, the device may execute the application in the present window without movement, such as the window set to the traceable mode or set to the non-traceable mode in operation S990.

The device according to an embodiment of the present disclosure may compare the received sensed user gesture with pre-stored gesture information. Based on the comparison result, the device may determine whether the identified user gesture is a user gesture for changing the window in which the application is executed, from the window set to the traceable mode to the window set to the non-traceable mode.

In operation S940, the device may determine whether the non-traceable mode setting is protected. Operation S940 may correspond to operation S830 described above with reference to FIG. 8. If it is detected that the setting is not protected in operation S940, the device may execute the application in the window set to the non-traceable mode in operation S970. If it is detected that the setting is protected in operation S940, the device may determine an authentication in operation S950.

In operation S950, the device may receive user authentication information for accessing the non-traceable mode. Operation S950 may correspond to operation S840 described above with reference to FIG. 8.

In operation S960, the device may determine whether the received user authentication information corresponds to pre-stored user authentication information. Operation S960 may correspond to operation S850 described above with reference to FIG. 8. If the received user authentication information corresponds to pre-stored user authentication information in operation S960, the device may execute the selected application in the window set to the non-traceable mode in operation S970. If the received user authentication information does not correspond to pre-stored user authentication information in operation S960, the device may execute the selected application in the window set to the traceable mode in operation S980.

The device according to an embodiment of the present disclosure may protect the privacy of the user by executing the application in the window set to the non-traceable mode. For example, when the user communicates a message including information about the user's health with a healthcare manager of the user through the device, the user may restrict the storage of the message by executing the message application in the window set to the non-traceable mode.

When the received user authentication information does not correspond to the pre-stored user authentication information, the device according to an embodiment of the present disclosure may execute the selected application in the window set to the traceable mode.

FIGS. 10A to 10F are diagrams illustrating a method for protecting a setting of a non-traceable mode for a window by a device according to an embodiment of the present disclosure by using user authentication information.

Figure 10A:
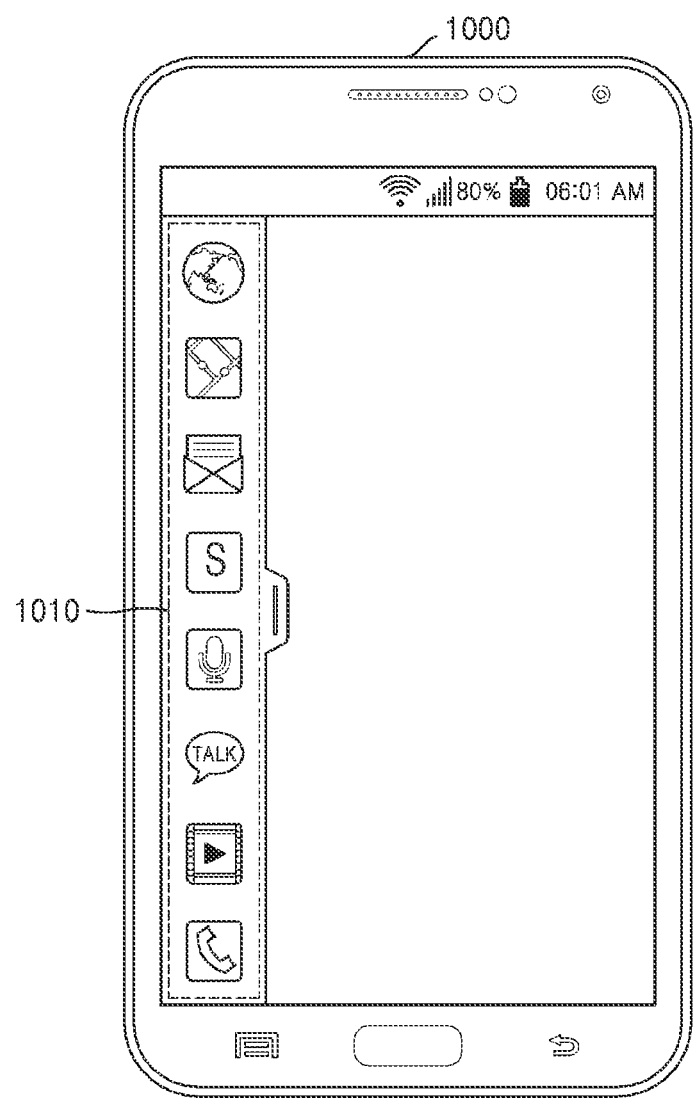
FIGS. 10A, 10B, 10C, 10D, 10E, and 10F are diagrams illustrating a method for protecting a setting of a non-traceable mode for a window by a device according to an embodiment of the present disclosure by using user authentication information.

Referring to FIG. 10A, a device 1000 may display a menu bar 1010 displaying icons about a plurality of applications executable in the device 1000. The device 1000 may execute the application corresponding to the icon selected by the user among the icons displayed in the menu bar 1010.

Figure 10B:
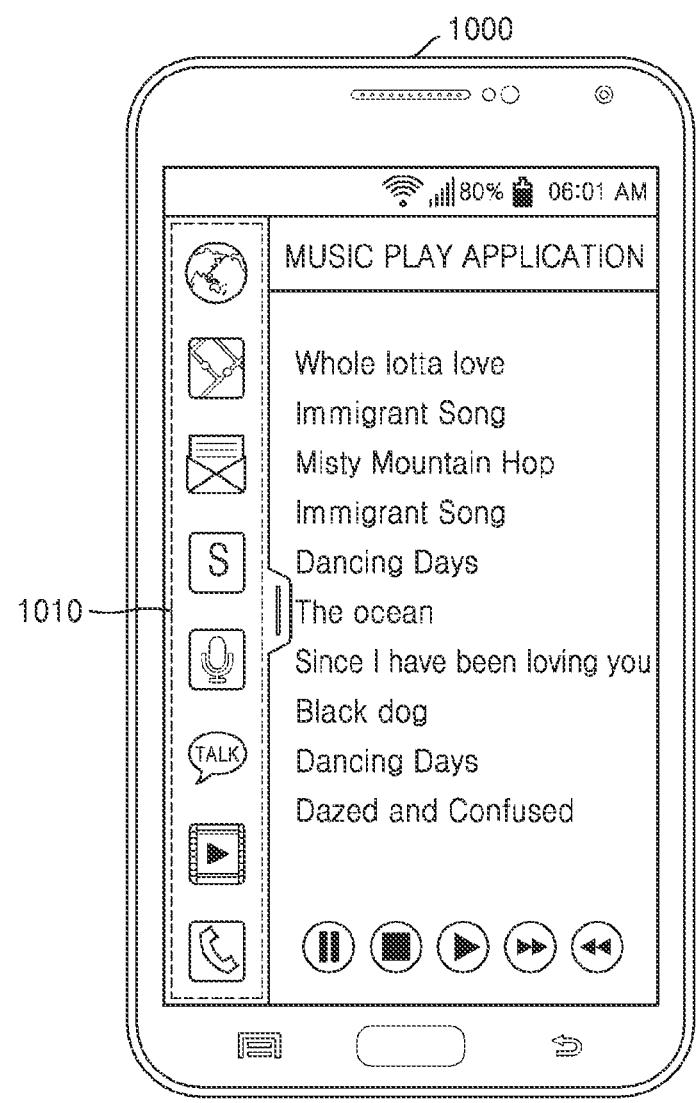

Referring to FIG. 10B, the device 1000 may execute a music play application when the user selects the icon of the music play application.

Figure 10C:
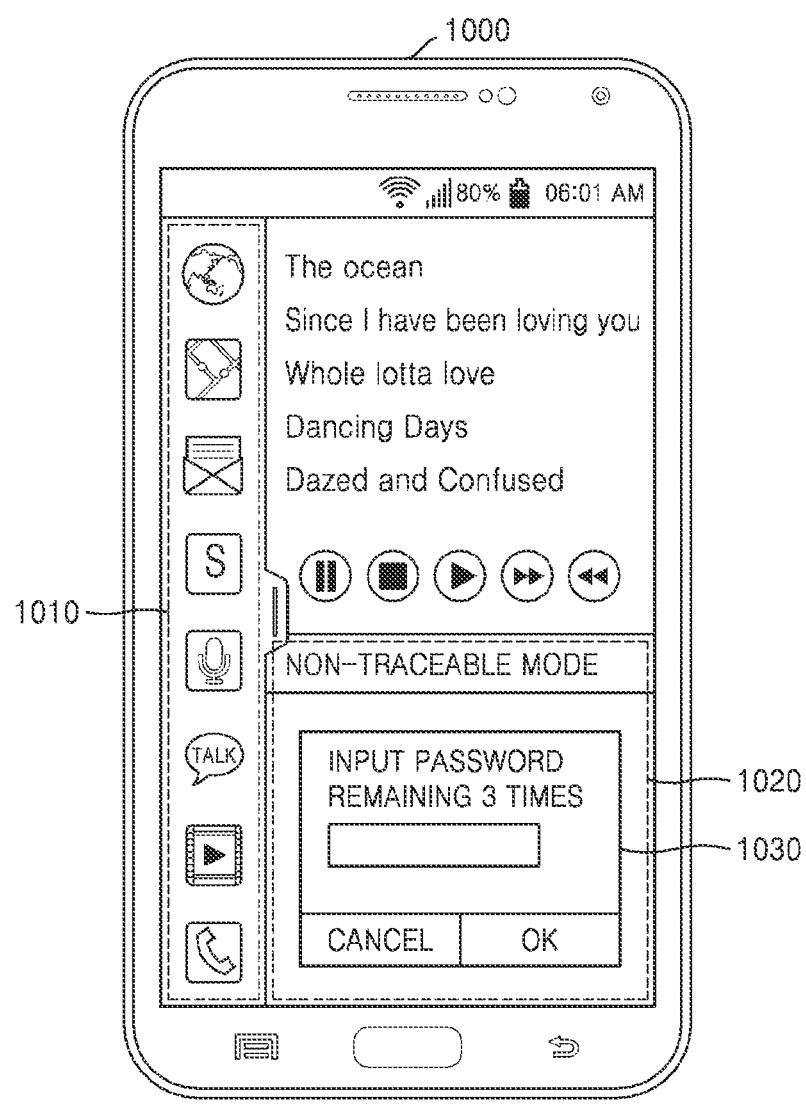

Referring to FIG. 10C, the device 1000 may sense a user gesture for requesting the execution of a call application in a window 1020 set to the non-traceable mode. For example, the device 1000 may sense a gesture of the user including movement of a user's finger toward the lower end of the device 1000 while touching the icon of the call application with the finger.

When sensing the user gesture, the device 1000 according to an embodiment of the present disclosure may display a message 1030 for requesting the user identification information.

Figure 10D:
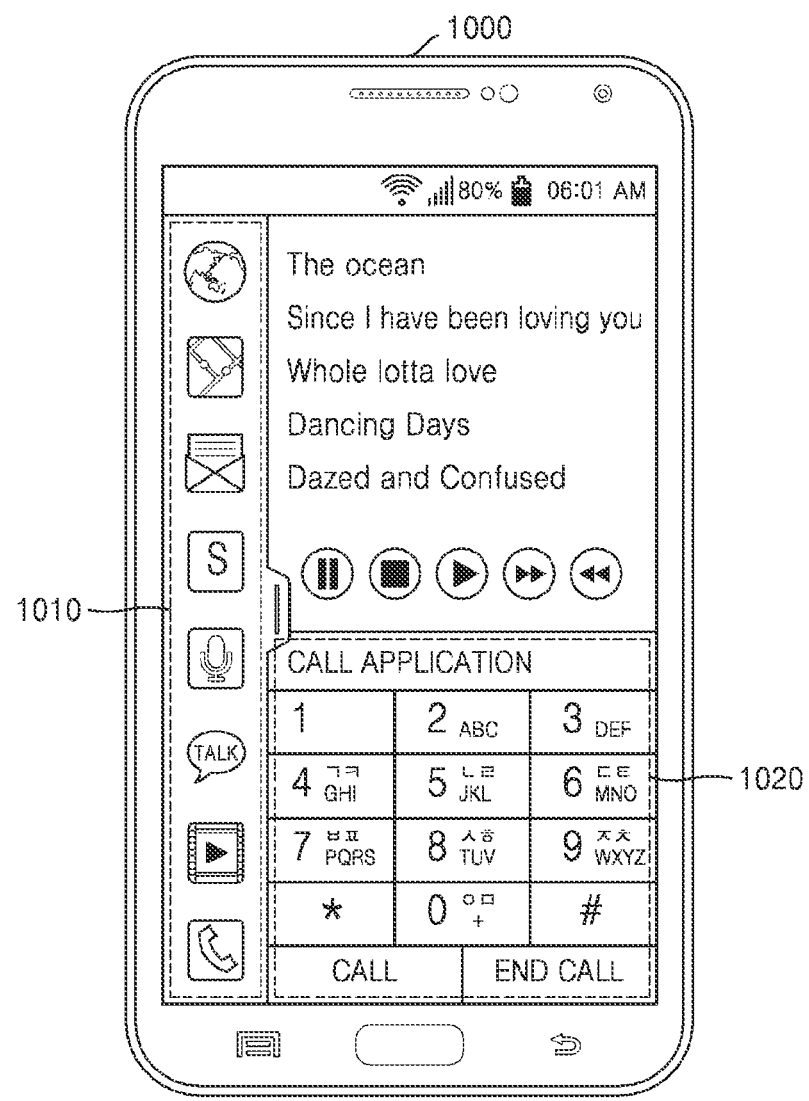

Referring to FIG. 10D, the device 1000 may execute the call application in the window 1020 set to the non-traceable mode when the user authentication information received from the user corresponds to pre-stored user authentication information.

Figure 10E:
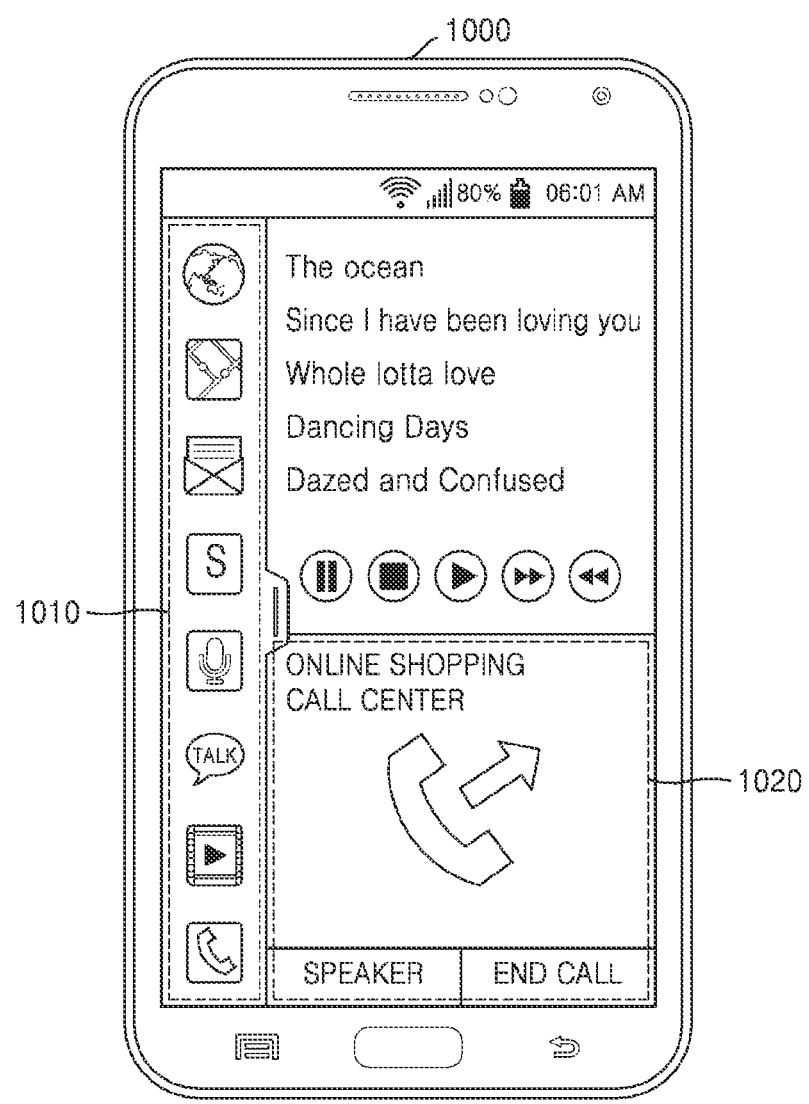

Referring to FIG. 10E, the device 1000 may attempt a call connection to, for example, an online shopping call center according to a user input.

Figure 10F:
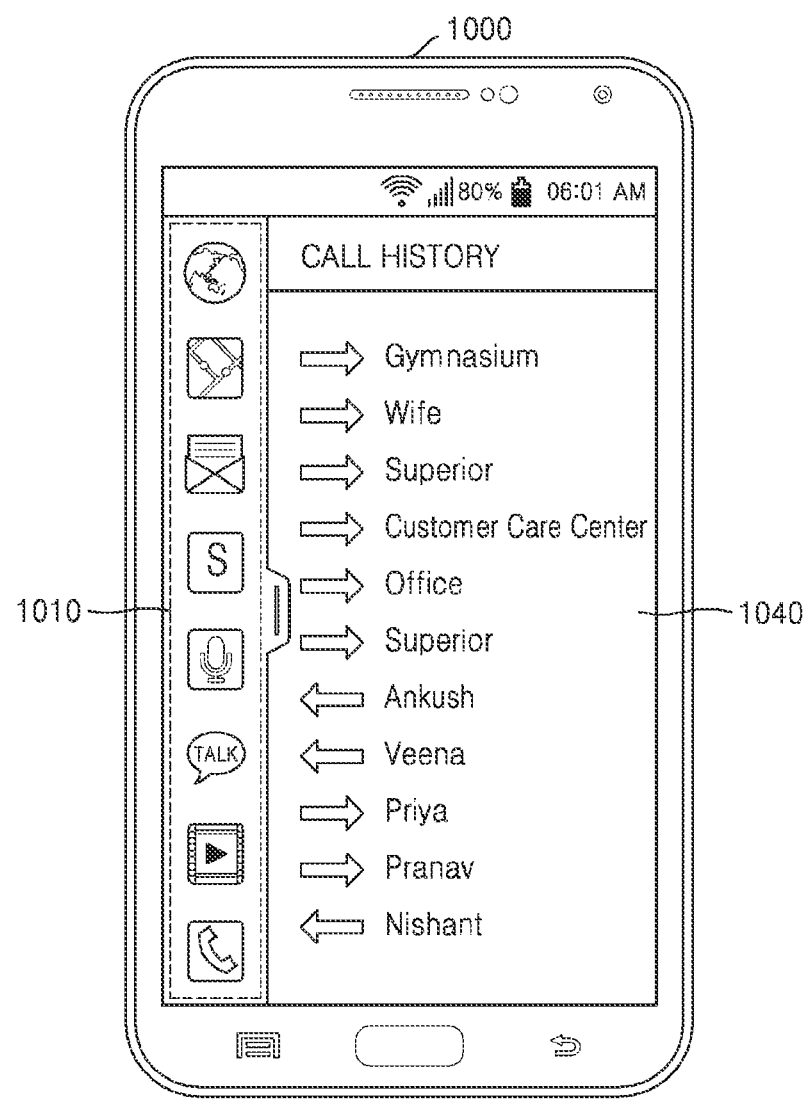

Referring to FIG. 10F, the device 1000 may display a list 1040 including data about a call history transmitted/received through the call application. The device 1000 according to an embodiment of the present disclosure may restrict the storage of data about a call history transmitted/received during the execution of the call application in the window 1020 set to the non-traceable mode. Accordingly, data about the call history transmitted to the online shopping call center may not be included in the list 1040.

Figure 11:
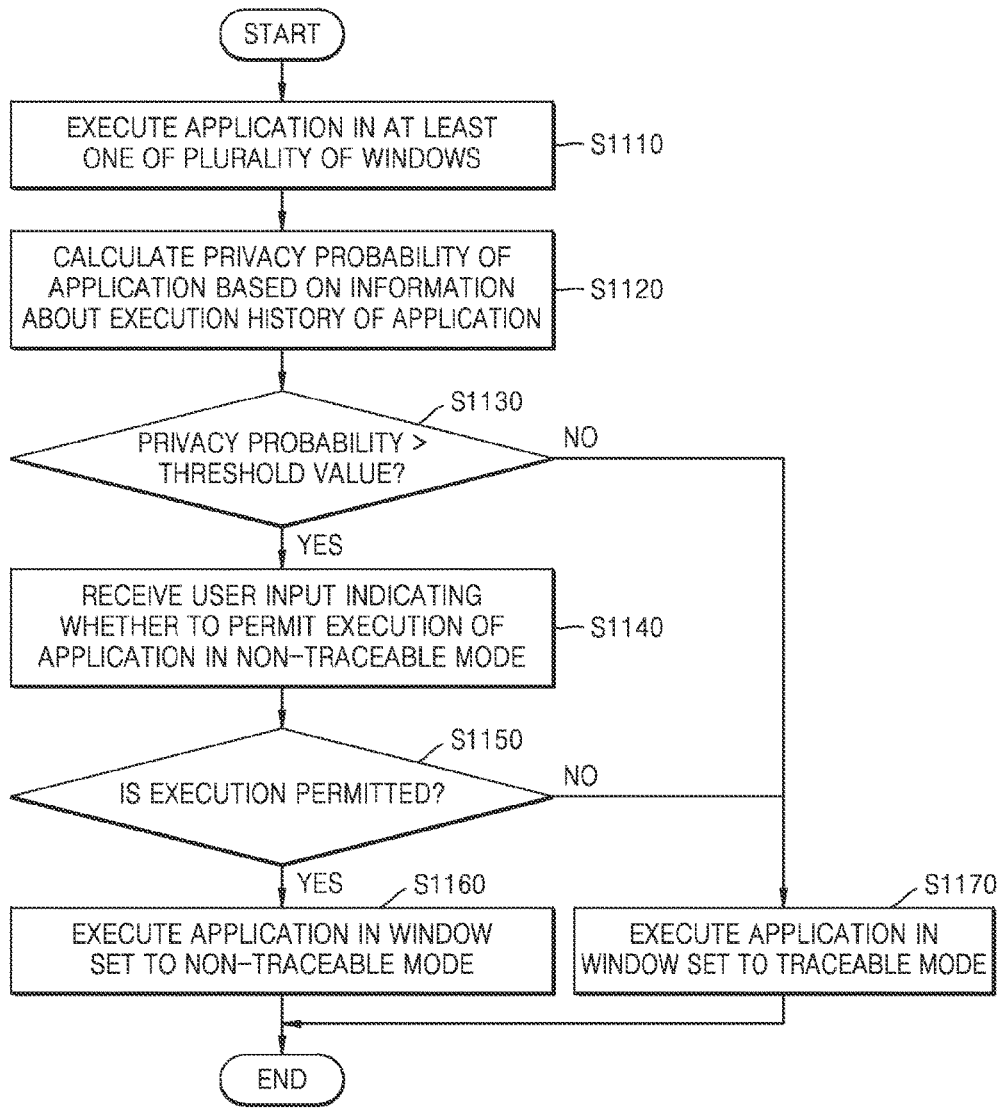
FIG. 11 is a flowchart illustrating a method for setting a mode of a window in which an application is executed, by calculating a privacy probability of the application by a device according to an embodiment of the present disclosure.

FIG. 11 is a flowchart illustrating a method for setting a mode of a window in which an application is executed, by calculating a privacy probability of the application by a device according to an embodiment of the present disclosure.

Referring to FIG. 11, in operation S1110, the device may execute an application in at least one of a plurality of windows.

The device according to an embodiment of the present disclosure may execute an application selected by the user among a plurality of executable applications in at least one of a plurality of windows. Operation S1110 may correspond to operation S110 described above with reference to FIG. 1.

In operation S1120, the device may calculate a privacy probability of the application based on information about an execution history of the application. According to an embodiment of the present disclosure, the information about the execution history of the application may include information about the number of times of previous execution of the application in the window set to the non-traceable mode, the number of times of execution in the window set to the traceable mode, the number of times of change of the mode of the window in which the application is executed, from the traceable mode to the non-traceable mode, the number of times of change from the non-traceable mode to the traceable mode, the frequency of execution of the application, and the sensitivity of data of the application. Herein, the sensitivity of the data may be determined according to the security level of the data. Also, the privacy probability may represent the probability of the application being executed in the window set to the non-traceable mode.

In operation S1130, the device may determine whether the calculated privacy probability of the application is greater than a threshold value. The device according to an embodiment of the present disclosure may preset the threshold value in order to determine the mode of the window in which the application is executed. If the calculated privacy probability of the application is not greater than a threshold value in operation S1130, the device may execute the application in the window set to the traceable mode in operation S1170. If the calculated privacy probability of the application is greater than a threshold value in operation S1130, the device may request user input in operation S1140.

In operation S1140, the device may receive a user input indicating whether to permit the execution of the application in the window set to the non-traceable mode.

When the calculated privacy probability of the application is greater than the threshold value, the device according to an embodiment of the present disclosure may display a message for checking whether to execute the application in the window set to the non-traceable mode. When the message is displayed by the device, the user may input information indicating whether to permit the execution of the application in the window set to the non-traceable mode, into the device.

In operation S1150, the device may determine whether the received user input permits the execution of the application in the window set to the non-traceable mode. If the received user input does not permit the execution of the application in operation S1150, the device may execute the application in the window set to the traceable mode in operation S1170. If the received user input does permit the execution of the application in operation S1150, the device may execute the application in the window set to the non-traceable mode in operation S1160.

In operation S1160, the device may execute the application in the window set to the non-traceable mode. When the user permits the execution of the application in the window set to the non-traceable mode, the device according to an embodiment of the present disclosure may execute the application in the window set to the non-traceable mode.

In operation S1170, the device may execute the application in the window set to the traceable mode. When the calculated privacy probability of the application is smaller than or equal to the threshold value in operation S1130, the device according to an embodiment of the present disclosure may execute the application in the window set to the traceable mode in operation S1170. Also, according to an embodiment of the present disclosure, when the user does not permit the execution of the application in the window set to the non-traceable mode in operation S1150, the device may execute the application in the window set to the traceable mode in operation S1170, among the plurality of windows.

Figure 12A:
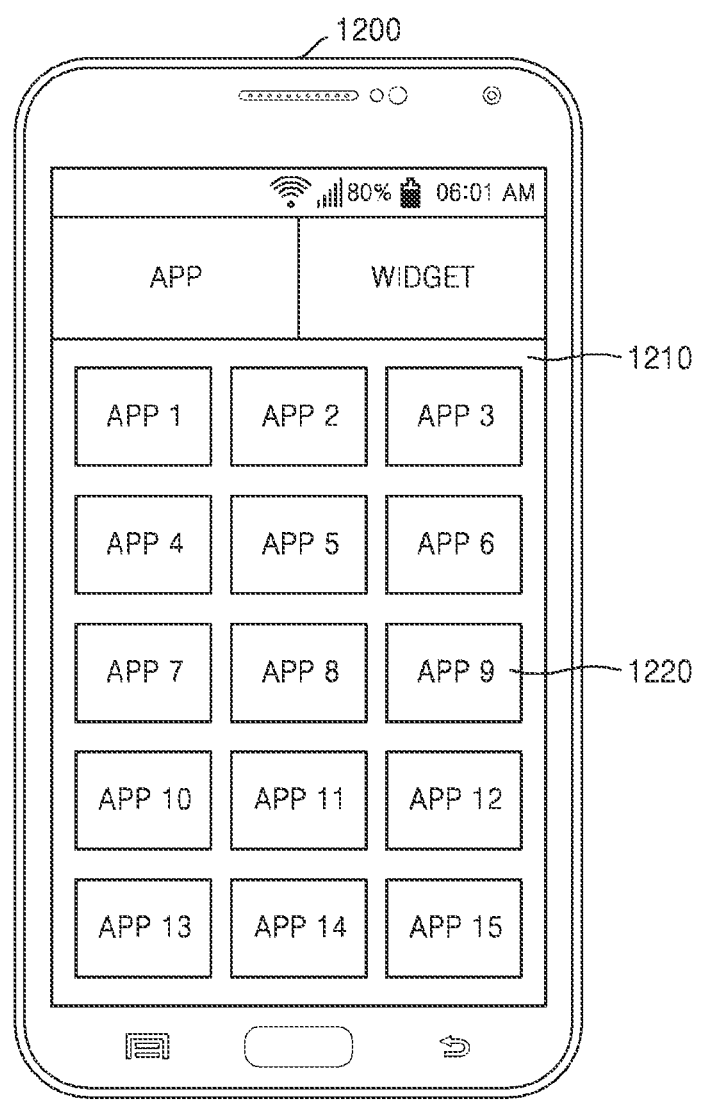
FIGS. 12A and 12B are diagrams illustrating a method for setting a mode of a window in which an application is executed, by calculating a privacy probability of the application by a device according to an embodiment of the present disclosure.
Figure 12B:
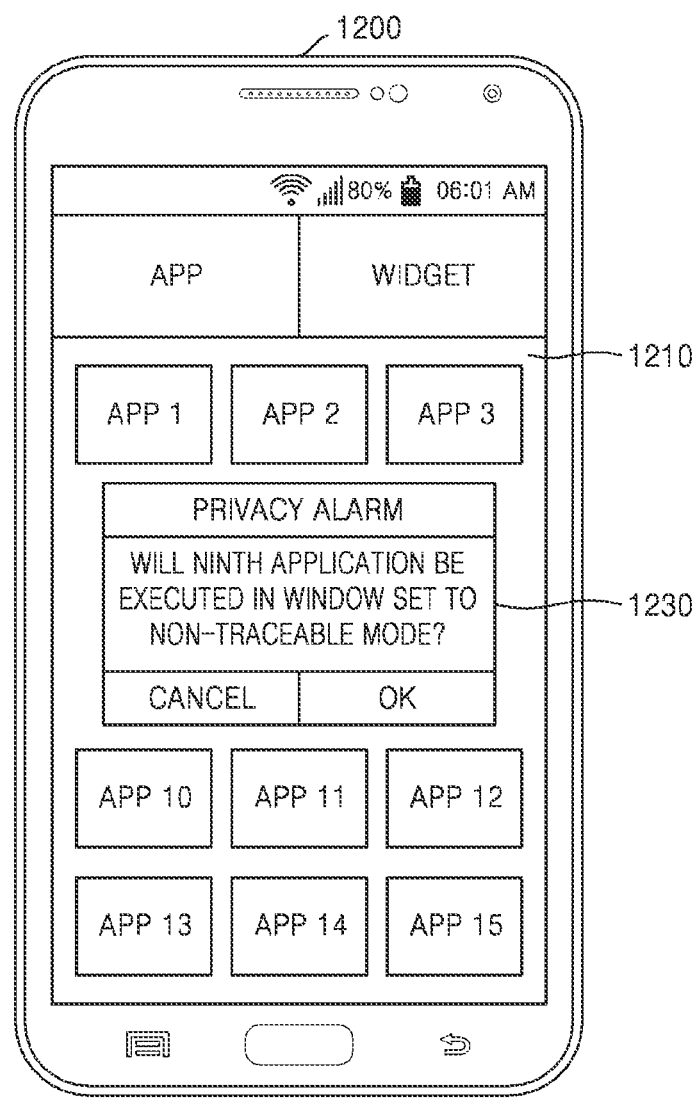

FIGS. 12A and 12B are diagrams illustrating a method for setting a mode of a window in which an application is executed, by calculating a privacy probability of the application by a device according to an embodiment of the present disclosure.

Referring to FIG. 12A, a device 1200 may display a list 1210 including information about a plurality of applications executable in the device 1200. The device 1200 may acquire a user input for selecting any one of the applications "APP 1" to "APP 15". For example, the device 1200 may acquire a user input for requesting the execution of a video application "APP 9" 1220.

Referring to FIG. 12B, when "APP 9" 1220 is selected, the device 1200 may calculate a privacy probability of "APP 9" 1220. When the calculated privacy probability of "APP 9" 1220 is greater than a threshold value, the device 1200 may display a message 1230 for checking whether the user will execute "APP 9" 1220 in the window set to the non-traceable mode.

When the user permits the execution of "APP 9" 1220 in the window set to the non-traceable mode, the device 1200 according to an embodiment of the present disclosure may execute "APP 9" 1220 in the window set to the non-traceable mode, among the plurality of windows. According to an embodiment of the present disclosure, when the user permits the execution of "APP 9" 1220 in the window set to the traceable mode, the device 1200 may execute "APP 9" 1220 in the window set to the traceable mode, among the plurality of windows.

FIGS. 13A to 13F are diagrams illustrating a method for setting a mode of a window in which an application is executed, by calculating a privacy probability of the application by a device according to an embodiment of the present disclosure.

Figure 13A:
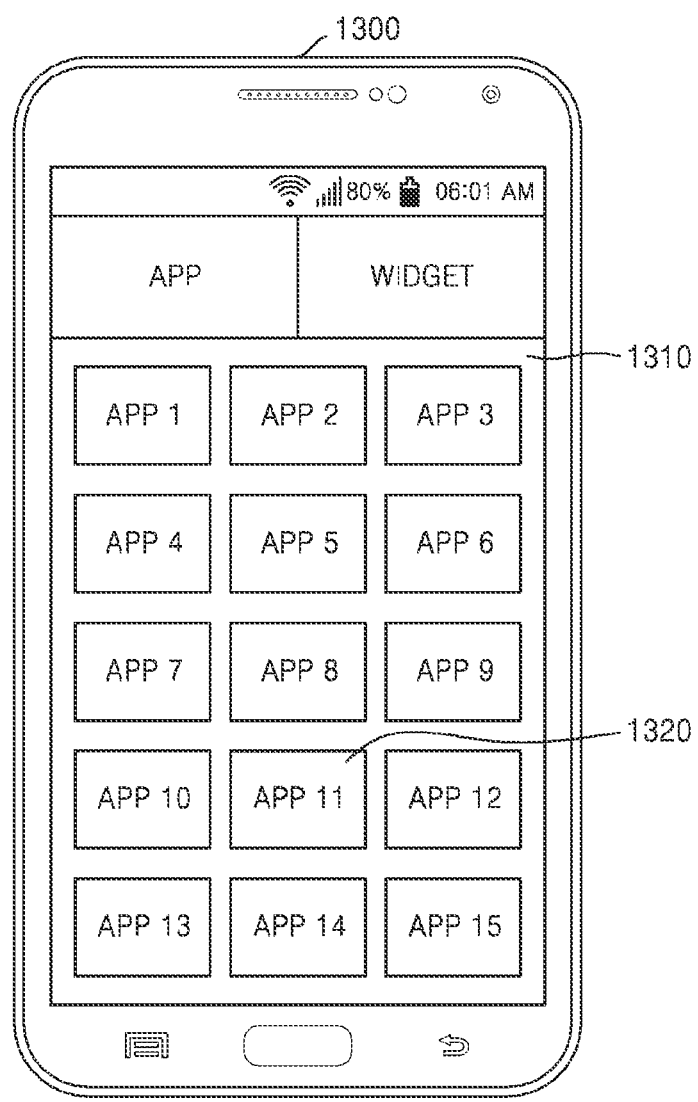
FIGS. 13A, 13B, 13C, 13D, 13E, and 13F are diagrams illustrating a method for setting a mode of a window in which an application is executed, by calculating a privacy probability of the application by a device according to an embodiment of the present disclosure.

Referring to FIG. 13A, a device 1300 may display a list 1310 including information about a plurality of applications "APP 1" to "APP 15" executable in the device 1300. The device 1300 may acquire a user input for selecting any one of the applications. For example, the device 1300 may acquire a user input for requesting the execution of a music play application "APP 11" 1320.

Figure 13B:
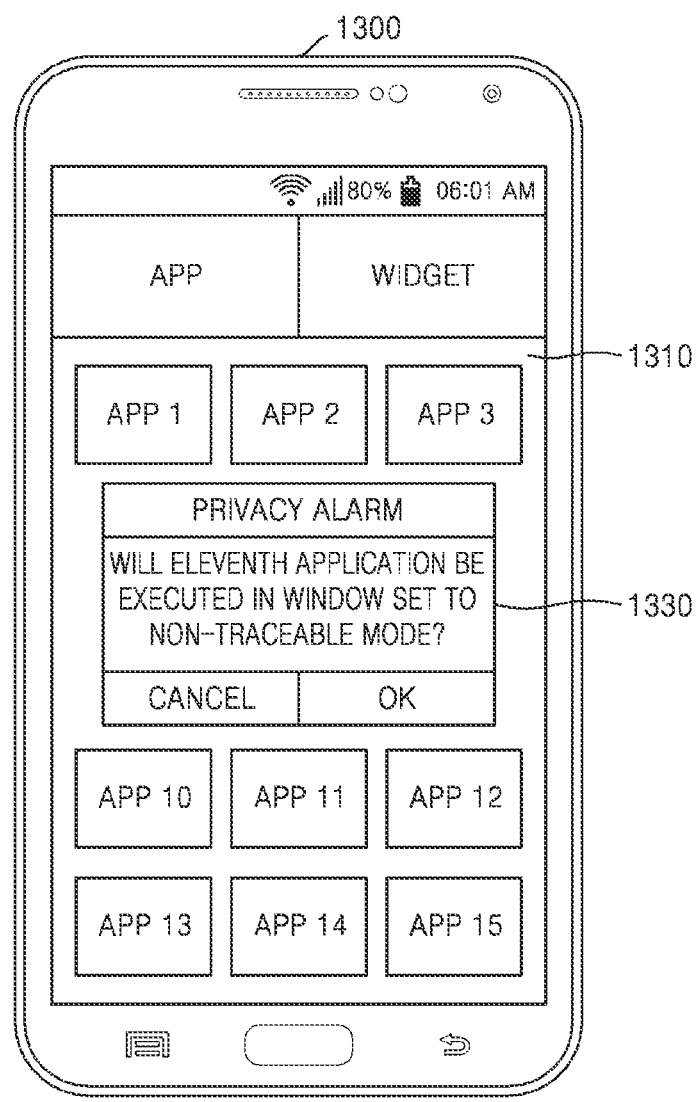

Referring to FIG. 13B, when "APP 11" 1320 is selected, the device 1300 may calculate a privacy probability of "APP 11" 1320. When the calculated privacy probability of "APP 11" 1320 is greater than a threshold value, the device 1300 may display a message 1330 for checking whether the user will execute "APP 11" 1320 in the window set to the non-traceable mode.

Figure 13C:
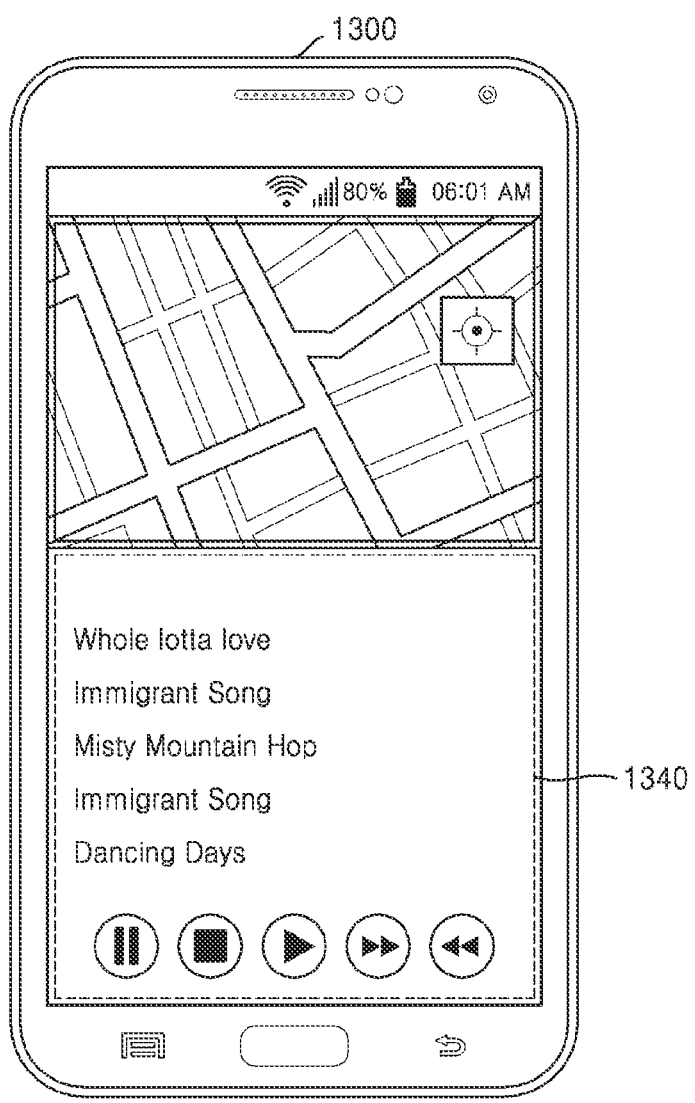

Referring to FIG. 13C, the device 1300 according to an embodiment of the present disclosure may execute the music play application, which is "APP 11" 1320, in a window 1340 set to the non-traceable mode.

Figure 13D:
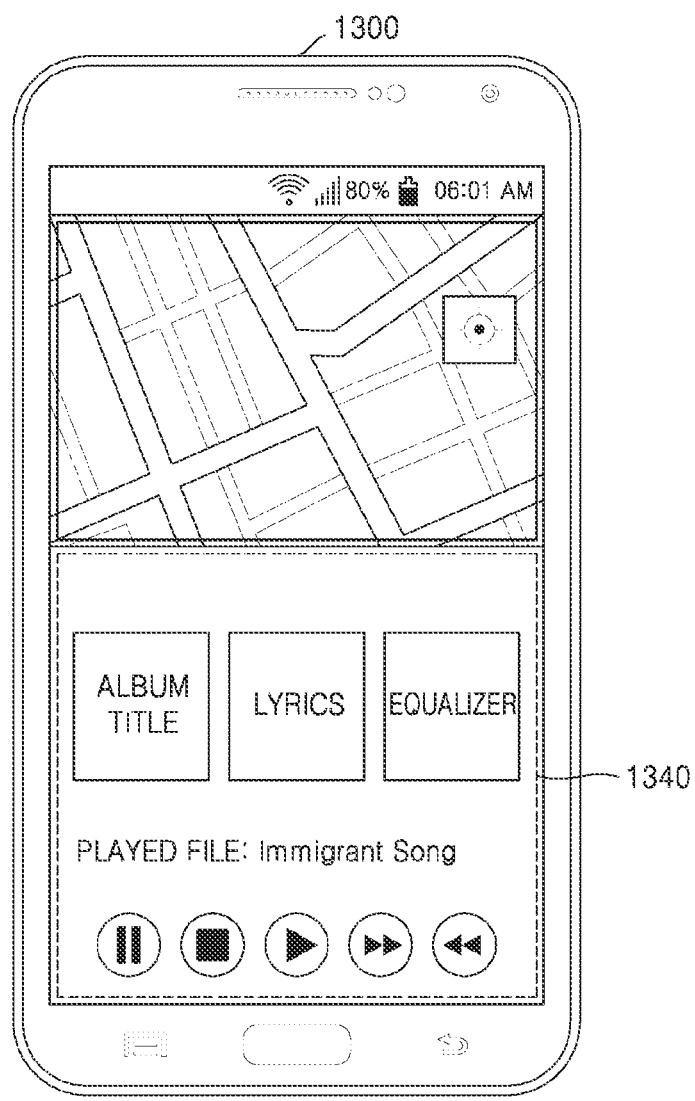

Referring to FIG. 13D, the device 1300 according to an embodiment of the present disclosure may play, pause or stop the music "Immigrant Song" selected by the user, and review album title, lyrics and equalizer settings.

Figure 13E:
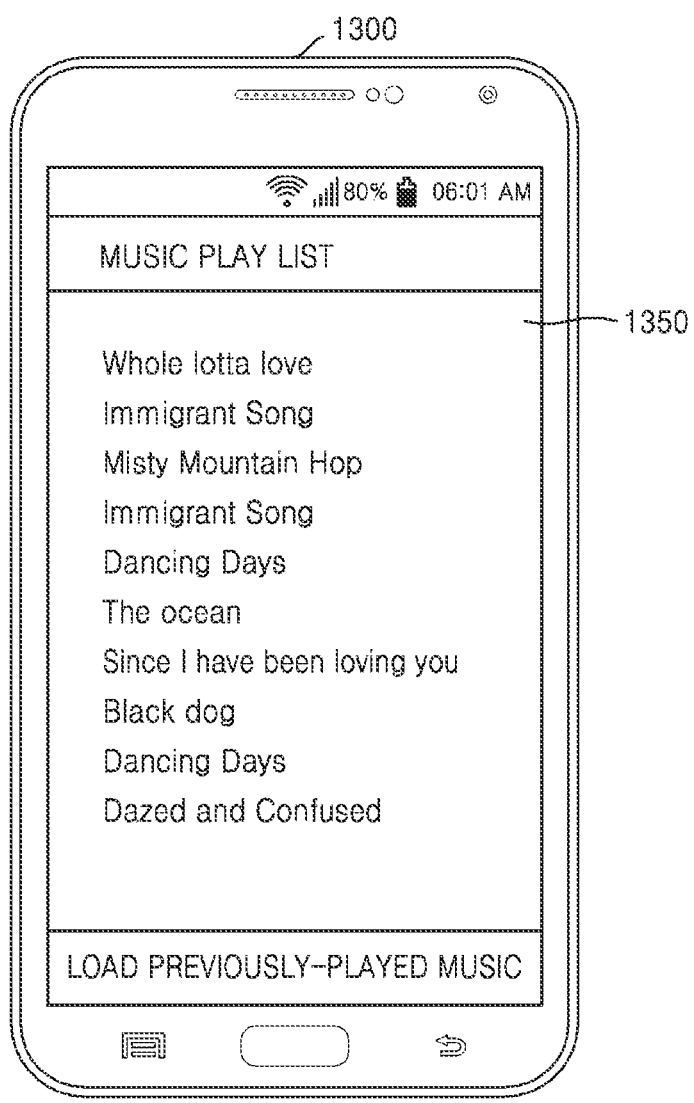

Referring to FIG. 13E, the device 1300 may display a list 1350 including information about the played music. When the music play application is executed in the window set to the non-traceable mode, the device 1300 according to an embodiment of the present disclosure may not store data about the selected and played music "Immigrant Song". When the device 1300 restricts the storage of the data about the music "Immigrant Song", the data about the selected and played music "Immigrant Song" may not be included in the list 1350.

Figure 13F:
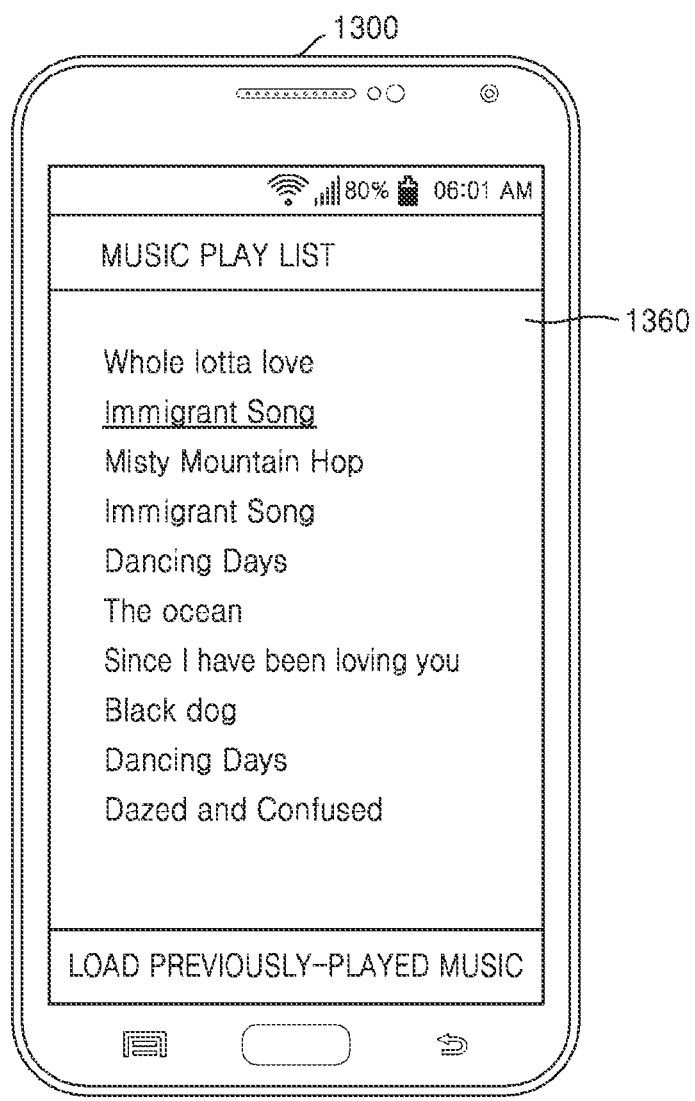

FIG. 13F illustrates a list 1360 that is generated when the device 1300 executes the music play application in the window set to the traceable mode. When the music "Immigrant Song" is played in the window set to the traceable mode, the data about the music "Immigrant Song" may be stored in the device 1300. Accordingly, the data about the selected and played music "Immigrant Song" may be included in the list 1360.

Figure 14:
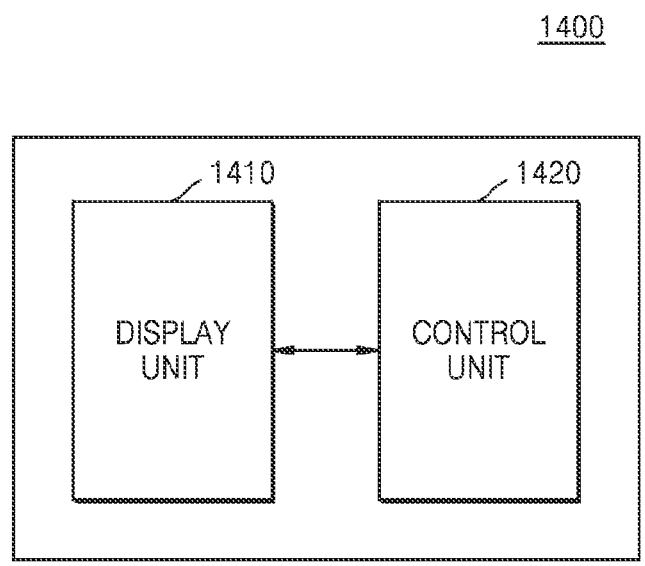
FIGS. 14 and 15 are block diagrams of a device according to an embodiment of the present disclosure.
Figure 15:
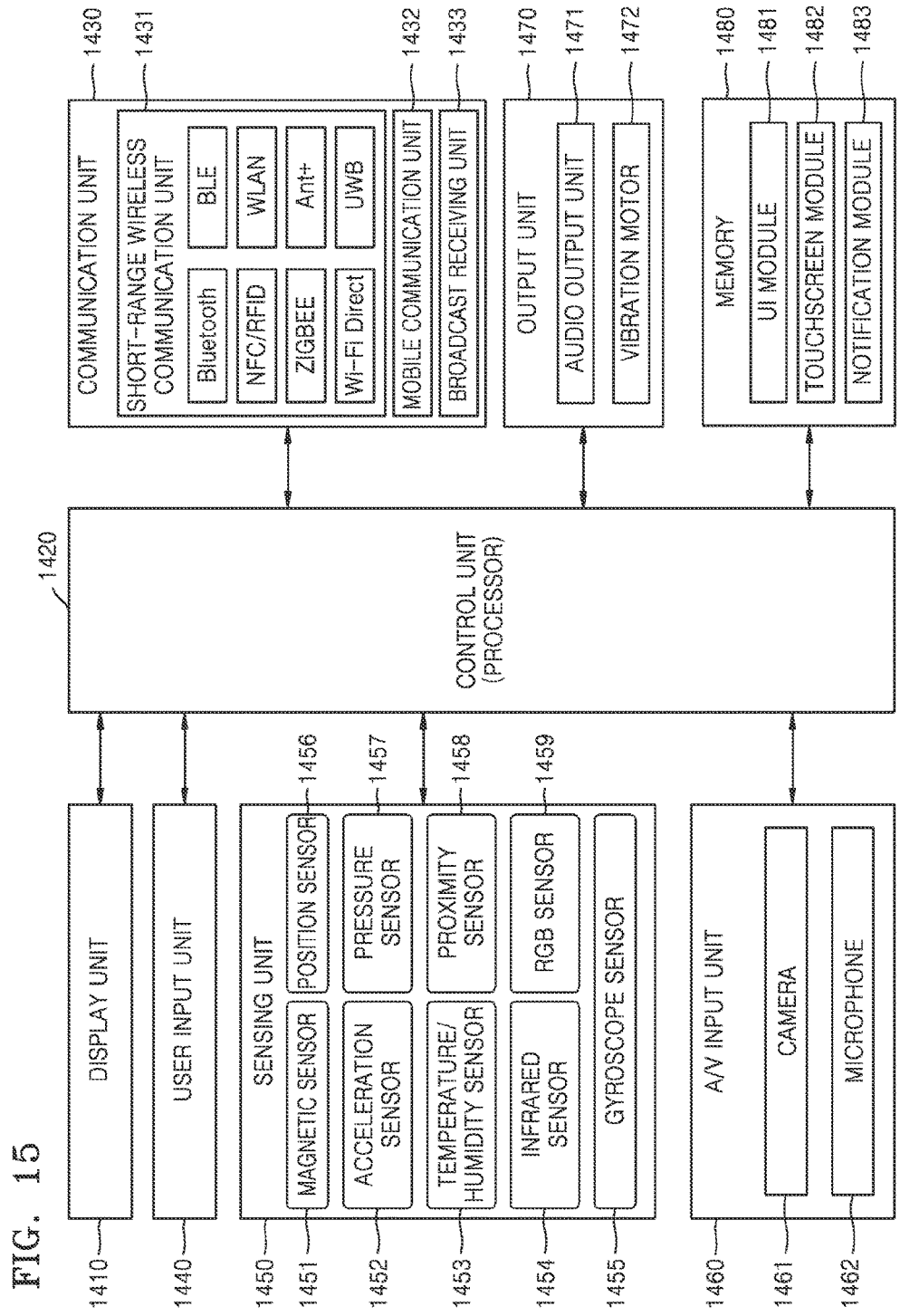

FIGS. 14 and 15 are block diagrams of a device according to an embodiment of the present disclosure.

Referring to FIG. 14, a device 1400 may include a display unit 1410 and a control unit 1420. However, all the elements illustrated in FIG. 14 are not necessary elements of the device 1400. The device 1400 may include additional elements or fewer elements than those illustrated in FIG. 14.

For example, referring to FIGS. 14 and 15, the first device 1400 according to an embodiment of the present disclosure may further include a communication unit 1430, a user input unit 1440, a sensing unit 1450, an audio/video (A/V) input unit 1460, an output unit 1470, and a memory 1480 in addition to the display unit 1410 and the control unit 1420.

The display unit 1410 may display a plurality of windows. The display unit 1410 according to an embodiment of the present disclosure may also display a tray or an application launcher including information about applications so that the applications may be intuitively executed in a plurality of window environments. Herein, for example, an icon representing each of the applications may be displayed in the tray. Also, pop-up objects representing the respective applications may be included in the tray.

The display unit 1410 according to an embodiment of the present disclosure may also display a message for checking whether to permit the execution of an application having a privacy probability calculated by the control unit 1420 that is greater than a threshold value, in a window set to a non-traceable mode.

The display unit 1410 may also display information representing the non-traceable mode on at least one window set to the non-traceable mode, and may also display information representing the traceable mode on at least one window set to the traceable mode.

For example, the display unit 1410 may include, but is not limited to, a keypad, a dome switch, a touch pad (e.g., a capacitive overlay type, a resistive overlay type, an infrared beam type, a surface acoustic wave type, an integral strain gauge type, or a piezoelectric type), a jog wheel, and a jog switch.

The display unit 1410 may also include a touchscreen with a layer structure of a touch pad. The display unit 1410 may also include at least one of a liquid crystal display (LCD), a thin film transistor LCD (TFT-LCD), an organic light-emitting diode (OLED) display, a flexible display, a three-dimensional (3D) display, and an electrophoretic display. The device 1400 may also include two or more display units 1410 according to various embodiments of the present disclosure.

The control unit 1420 may control the overall operations of the device 1400. For example, the control unit 1420 may control the overall operations of the display unit 1410, the communication unit 1430, the user input unit 1440, the sensing unit 1450, the A/V input unit 1460, the output unit 1470, and the memory 1480 by executing programs stored in the memory 1480.

The control unit 1420 may select at least one of a plurality of windows displayed by the device 1400 based on a sensed user input. The control unit 1420 may set or preset the selected at least one window to the non-traceable mode or the traceable mode. The control unit 1420 may restrict the storage of data generated according to the execution of the application in the at least one window set to the non-traceable mode.

The control unit 1420 according to an embodiment of the present disclosure may determine whether the sensed user input corresponds to a preset gesture. The control unit 1420 may select at least one of the plurality of windows when the user input corresponds to a preset gesture directing such selection.

The control unit 1420 according to an embodiment of the present disclosure may execute the application selected among a plurality of applications executable by the device 1400 in any one of the at least one window set to the non-traceable mode or the traceable mode.

When requested to execute the application in any window set to the non-traceable mode, the control unit 1420 according to an embodiment of the present disclosure may first request user authentication information from the user. The control unit 1420 may execute the selected application in the at least one window set to the non-traceable mode when the user authentication information received according to the request corresponds to pre-stored user authentication information.

The control unit 1420 according to an embodiment of the present disclosure may also calculate a privacy probability of each of the applications based on information about an execution history of the application currently-executed in each of the windows. The control unit 1420 according to an embodiment of the present disclosure may execute the application having a calculated privacy probability greater than a threshold value, in the window set to the non-traceable mode.

The control unit 1420 according to an embodiment of the present disclosure may also change the mode of the at least one window set to the non-traceable mode into the traceable mode when acquiring a user input for requesting a trace mode conversion of the window. The control unit 1420 may store data generated according to the execution of the application in the at least one window set to the traceable mode, in the memory 1480.

Returning to FIG. 15, the communication unit 1430 may include one or more elements for allowing communication between the device 1400 and other devices. For example, the communication unit 1430 may include a short-range wireless communication unit 1431, a mobile communication unit 1432, and a broadcast receiving unit 1433.

The short-range wireless communication unit 1431 may include, but is not limited to, a Bluetooth (BT) communication unit, a BT Low Energy (BLE) communication unit, a near field communication unit, a wireless local area network (WLAN (WiFi)) communication unit, a ZigBee communication unit, an infrared data association (IrDA) communication unit, a WiFi Direct (WFD) communication unit, a ultra wideband (UWB) communication unit, and Ant+ communication unit.

The mobile communication module 1432 may transmit/receive wireless signals with at least one of a base station, an external terminal, and a server on a mobile communication network (not illustrated). Herein, the wireless signals may include voice call signals, video call signals, or various types of data for transmission and reception of text/multimedia messages.

The broadcast receiving unit 1433 may receive broadcast signals and/or broadcast-related information from external devices through broadcast channels. The broadcast channels may include satellite channels and terrestrial channels. In various embodiments of the present disclosure, the device 1400 may not include the broadcast receiving unit 1433.

The user input unit 1440 may refer to a unit through which the user inputs data for controlling the device 1400. For example, the user input unit 1440 may include, but is not limited to, a keypad, a dome switch, a touch pad (e.g., a capacitive overlay type, a resistive overlay type, an IR beam type, a surface acoustic wave type, an integral strain gauge type, or a piezoelectric type), a jog wheel, and a jog switch.

According to an embodiment of the present disclosure, when a user input sensed by the user input unit 1440 corresponds to a preset gesture, the mode of the window in which the application is executed may be converted into the non-traceable mode or the traceable mode.

The sensing unit 1450 may detect a state of the device 1400 or a peripheral state of the device 1400 and transmit the detected information to the control unit 1420.

The sensing unit 1450 may include, but is not limited to, at least one of a magnetic sensor 1451, an acceleration sensor 1452, a temperature/humidity sensor 1453, an IR sensor 1454, a gyroscope sensor 1455, a position sensor (e.g., global positioning system (GPS) sensor) 1456, a pressure sensor 1457, a proximity sensor 1458, and a red/green/blue (RGB) sensor (illuminance sensor) 1459. Since those of ordinary skill in the art may intuitively infer the respective functions of the sensors from the respective names thereof, detailed descriptions thereof are omitted.

The A/V input unit 1460 may be used to input audio signals or video signals and may include a camera 1461 and a microphone 1462. The camera 1461 may obtain a video frame such as a still image or a moving image through an image sensor in a video call mode or a photographing mode. The image captured through the image sensor may be processed by the control unit 1420 or a separate image processing unit (not illustrated).

The image frame processed by the camera 1461 may be stored in the memory 1480 or may be transmitted through the communication unit 1430. Two or more cameras 1461 may be provided according to the configurations of the device 1400.

The microphone 1462 may receive an input of an external audio signal and process the same into electrical audio data. For example, the microphone 1462 may receive an audio signal from an external device or a speaker. The microphone 1462 may use various noise cancellation algorithms for canceling noise that may be generated during the input of an external audio signal.

The output unit 1470 may output an audio signal or a vibration signal and may include an audio output unit 1471 and a vibration motor 1472.

The audio output unit 1471 may output audio data received from the communication unit 1430 or stored in the memory 1480. Also, the audio output unit 1471 may output audio signals related to functions (e.g., call signal reception, message reception, and notification) performed in the device 1400. The audio output unit 1471 may include a speaker and a buzzer.

The vibration motor 1472 may output a vibration signal. For example, the vibration motor 1472 may output a vibration signal corresponding to an output of audio data or video data (e.g., a call signal reception sound and a message reception sound). Also, the vibration motor 1472 may output a vibration signal when a touch is input to the touchscreen.

The memory 1480 may store one or more programs for processing and controlling the control unit 1420, and may store input/output data.

The memory 1480 may include one or more types of storage medium including flash memory type, hard disk type, multimedia card micro type, card type memory (e.g., secure digital (SD) and extreme digital (XD) memories), random-access memory (RAM), static RAM (SRAM), read-only memory (ROM), electronically erasable programmable ROM (EEPROM), PROM, magnetic memory, magnetic disk, and optical disk. Also, the device 1400 may include cloud server or web storage abilities for performing storage functions of the memory 1480 on the Internet.

The programs stored in the memory 1480 may be classified into a plurality of modules according to their functions and may be classified into, for example, a UI module 1481, a touchscreen module 1482, and a notification module 1483.

The UI module 1481 may provide a specialized UI and graphical UI (GUI) that interlock with the device 1400 for respective applications.

The UI module 1481 may also divide the screen to display a plurality of windows. The UI module 1481 may also display each of the applications executed by the device 1400 in each of the windows.

The touchscreen module 1482 may sense a touch gesture of the user on the touchscreen and transmit information about the touch gesture to the control unit 1420.

The touchscreen module 1482 according to an embodiment of the present disclosure may recognize and analyze a touch code. The touchscreen module 1482 may include separate hardware including a controller.

Various sensors may be provided in or near the touchscreen to sense a proximity touch or a touch to the touchscreen. An example of a sensor for sensing a touch to the touchscreen may be a tactile sensor. The tactile sensor may refer to a sensor that senses a touch of an object to the degree of a human sense or greater. The tactile sensor may sense a variety of information, such as the roughness of a touch surface, the hardness of a touch object, and the temperature of a touch point.

Another example of a sensor for sensing a touch to the touchscreen may be proximity sensor.

The proximity sensor may refer to a sensor that detects the presence of an object approaching a predetermined detection surface or an object located in the proximity thereof without mechanical contact by using an electromagnetic force or IR rays. Examples of a proximity sensor may include, but are not limited to, transmission type photoelectric sensors, direct reflection type photoelectric sensors, mirror reflection type photoelectric sensors, high frequency oscillation type proximity sensors, electrostatic capacity type proximity sensors, magnetic type proximity sensors, and IR proximity sensors. Examples of a touch gesture of the user may include, but are not limited to, tap, touch and hold, double tap, drag, panning, flick, drag and drop, and swipe.

The notification module 1483 may generate a signal for notifying the occurrence of an event in the device 1400. Examples of the event occurring in the device 1400 may include, but are not limited to, call signal reception, message reception, key signal input, and schedule notification.

The notification module 1483 may output a notification signal of a video signal type through the display unit 1410, output a notification signal of an audio signal type through the audio output unit 1471, and output a notification signal of a vibration signal type through the vibration motor 1472.

Although FIGS. 14 and 15 illustrate the modules constituting the device 1400, the various embodiments of the present disclosure are not limited thereto. The labels and names of the modules are only used to describe the various embodiments of the present disclosure and are not intended to limit the scope of the inventive concept. Also, the modules included in the device 1400 may be combined or divided in any manner to implement the embodiment of the present disclosure.

The device 1400 may further include other modules such as hardware or software components, and may communicate with other remote devices to control operations in a plurality of window environments. Herein, the components may include control units, process execution objects, processes, execution threads, programs, or computers.

The methods according to the various embodiments of the present disclosure may be stored in a computer-readable recording medium by being implemented in the form of program commands that may be performed by various computer means. The computer-readable recording medium may include program commands, data files, and data structures either alone or in combination. The program commands may be those that are especially designed and configured for the inventive concept, or may be those that are publicly known and available to those of ordinary skill in the art. Examples of the computer-readable recording medium may include magnetic recording media such as hard disks, floppy disks and magnetic tapes, optical recording media such as compact disk-ROM (CD-ROMs) and digital versatile discs (DVDs), magneto-optical recording media such as floptical disks, and hardware devices such as ROMs, RAMs and flash memories that are especially configured to store and execute program commands. Examples of the program commands may include machine language codes created by a compiler, and high-level language codes that may be executed by a computer by using an interpreter.

The apparatuses according to the various embodiments of the present disclosure may include a processor, a memory for storing and executing program data, a permanent storage such as a disk drive, a communication port for communicating with an external device, and UI devices such as a touch panel, keys, and buttons. The methods implemented by software modules or algorithms may be stored on a non-transitory computer-readable recording medium as computer-readable codes or program commands that are executable on the processor. Examples of the computer-readable recording medium may include magnetic storage media (e.g., ROMs, RAMs, floppy disks, and hard disks) and optical recording media (e.g., CD-ROMs and DVDs). The computer-readable recording medium may also be distributed over network-coupled computer systems so that the computer-readable codes may be stored and executed in a distributed fashion. The computer-readable recording medium is readable by a computer, and may be stored in a memory and executed in a processor.

Reference has been made to the various embodiments of the present disclosure illustrated in the drawings, and particular terms have been used to describe the various embodiments of the present disclosure. However, the scope of the inventive concept is not limited by the particular terms, and the inventive concept may encompass all elements that may be generally conceived by those of ordinary skill in the art.

The various embodiments of the present disclosure may be described in terms of functional block components and various processing operations. Such functional blocks may be implemented by any number of hardware and/or software components that execute particular functions. For example, the various embodiments of the present disclosure may employ various integrated circuit (IC) components, such as memory elements, processing elements, logic elements, and lookup tables, which may execute various functions under the control of one or more microprocessors or other control devices. Also, the various embodiments of the present disclosure may employ homogeneous or heterogeneous cores and heterogeneous central processing units (CPUs). Similarly, where the elements of the various embodiments of the present disclosure may be implemented by software programming or software elements, the various embodiments of the present disclosure may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the various embodiments of the present disclosure may employ the related art for electronic environment setting, signal processing, and/or data processing. Terms such as "mechanism," "element," "unit," and "configuration" may be used in a broad sense, and are not limited to mechanical and physical configurations. The terms may include the meaning of software routines in conjunction with processors or the like.

Particular implementations described herein are not intended to limit the scope of the various embodiments of the present disclosure in any way. For the sake of conciseness, descriptions of related art electronic configurations, control systems, software, and other functional aspects of the systems may be omitted. Also, the connection lines or connection members between various elements illustrated in the drawings represent functional connections and/or physical or logical connections between the various elements, and various alternative or additional functional connections, physical connections, or logical connections may be present in a practical apparatus. Also, no element may be essential to the practice of the inventive concept unless the element is specifically described as "essential" or "critical".

The use of the terms "a", "an", and "the" and similar referents in the context of the present disclosure (especially in the context of the following claims) may be construed to cover both the singular and the plural. Also, recitation of a range of values herein are merely intended to serve as a shorthand method of referring individually to each separate value falling within the range, unless otherwise indicated herein, and each separate value is incorporated into the present disclosure as if it was individually recited herein. Also, the operations of the method described herein may be performed in any suitable order unless otherwise indicated herein or otherwise clearly contradicted by the context. The scope of the various embodiments of the present disclosure is not limited to the above-described operation order. All examples or terms (e.g., "such as") provided herein are merely used to describe the various embodiments of the present disclosure in detail, and the scope of the various embodiments of the present disclosure is not limited by the examples or terms unless otherwise claimed. Also, those of ordinary skill in the art will readily understand that various modifications and combinations may be made according to design conditions and factors without departing from the spirit and scope of the inventive concept as defined by the following claims.

It should be understood that various embodiments of the present disclosure described herein should be considered in a descriptive sense only and not for purposes of limitation. Descriptions of features or aspects within each embodiment of the present disclosure should typically be considered as available for other similar features or aspects in other various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for executing an application, the method comprising:

selecting at least one of a plurality of windows displayed by a device based on a user input, each of the plurality of windows corresponding to each of a plurality of applications;

setting the selected at least one window in which at least one application among the plurality of applications is included to a non-traceable mode;

executing the at least one application in the selected at least one window set to the non-traceable mode; and restricting storage of data generated according to execution of the at least one application in the selected at least one window set to the non-traceable mode, wherein the plurality of applications in the plurality of windows are different from each other, and wherein a mode of the window including the non-traceable mode and a traceable mode can be set in response to receiving the user input for setting the mode of the window, or the at least one application can be moved between windows to control storage of data generated according to the execution of the at least one application based on a mode of the window including the non-traceable mode and the traceable mode.

2. The method of claim 1, further comprising determining whether the user input corresponds to a preset gesture, wherein the selecting of the at least one of the plurality of windows comprises selecting at least one of the plurality of windows when the user input corresponds to the preset gesture.

3. The method of claim 1, further comprising requesting user authentication information, wherein the executing of the application selected among the plurality of applications comprises executing the selected application in any one of the at least one window set to the non-traceable mode when received user authentication information corresponds to pre-stored user authentication information.

4. The method of claim 1, further comprising:

calculating a privacy probability of the application based on information about a mode of a window in which the application is currently executed and previously executed; and executing the application having the calculated privacy probability greater than a threshold value in any one of the at least one window set to the non-traceable mode.

5. The method of claim 4, further comprising displaying a message requesting user input to permit execution of the application having the calculated privacy probability greater than the threshold value in any one of the at least one window set to the non-traceable mode.

6. The method of claim 1, further comprising:

acquiring a user input for requesting a mode conversion of the at least one window set to the non-traceable mode;

setting the at least one window set to the non-traceable mode to the traceable mode; and storing data generated according to execution of the application in the at least one window set to the traceable mode.

7. The method of claim 1, further comprising displaying the plurality of windows when at least two applications are selected among a plurality of applications executable by the device.

8. The method of claim 1, further comprising displaying identification information indicating that the at least one window is set to the non-traceable mode.

9. A non-transitory computer-readable recording medium that stores a program that performs the method of claim 1 when executed by a computer.

10. A device for executing an application, the device comprising:

a display configured to display a plurality of windows; and a processor configured to:

select at least one of the plurality of windows based on a user input, each of the plurality of windows corresponding to each of a plurality of applications, set the selected at least one window in which at least one application among the plurality of applications is included to a non-traceable mode, execute the at least one application in the selected at least one window set to the non-traceable mode, and restrict storage of data generated according to execution of the at least one application in the selected at least one window set to the non-traceable mode, wherein the plurality of applications executed in the plurality of windows are different from each other, and wherein a mode of the window including the non-traceable mode and a traceable mode can be set in response to receiving the user input for setting the mode of the window, or the at least one application can be moved between windows to control storage of data generated according to the execution of the at least one application based on a mode of the window including the non-traceable mode and the traceable mode.

11. The device of claim 10, wherein the processor is further configured to:

determine whether the user input corresponds to a preset gesture, and select at least one of the plurality of windows when the user input corresponds to the preset gesture.

12. The device of claim 10, wherein:

the display is further configured to display a message for requesting user authentication information, and the processor is further configured to execute the selected application in any one of the at least one window set to the non-traceable mode when the received user authentication information corresponds to pre-stored user authentication information.

13. The device of claim 10, wherein the processor is further configured to:

calculate a privacy probability of the application based on information about a mode of a window in which the application is currently executed and previously executed, and execute the application having the calculated privacy probability greater than a threshold value in any one of the at least one window set to the non-traceable mode.

14. The device of claim 13, wherein the display is further configured to:

display a message requesting user input to permit execution of the application having the calculated privacy probability greater than the threshold value in any one of the at least one window set to the non-traceable mode.

15. The device of claim 10, wherein:

the display is further configured to acquire a user input for requesting a mode conversion of the at least one window set to the non-traceable mode, and the processor is further configured to:

set the at least one window set to the non-traceable mode to the traceable mode, and store data generated according to execution of the application in the at least one window set to the traceable mode.

16. The device of claim 10, wherein the display is further configured to display the plurality of windows when at least two applications are selected among a plurality of applications executable by the device.

17. The device of claim 10, wherein the display is further configured to display identification information indicating that the at least one window is set to the non-traceable mode, in each of the at least one window.

* * * * *